United States Patent
Fang et al.

(10) Patent No.: US 10,689,730 B2
(45) Date of Patent: Jun. 23, 2020

(54) METHODS OF PRODUCING A TITANIUM PRODUCT

(71) Applicant: University of Utah Research Foundation, Salt Lake City, UT (US)

(72) Inventors: Zhigang Zak Fang, Salt Lake City, UT (US); Ying Zhang, Salt Lake City, UT (US); Yang Xia, Salt Lake City, UT (US); Pei Sun, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 422 days.

(21) Appl. No.: 14/935,245

(22) Filed: Nov. 6, 2015

(65) Prior Publication Data
US 2016/0108497 A1     Apr. 21, 2016

Related U.S. Application Data

(63) Continuation-in-part of application No. PCT/US2014/051621, filed on Aug. 19, 2014.
(Continued)

(51) Int. Cl.
*C22B 7/04* (2006.01)
*C22B 34/12* (2006.01)
(Continued)

(52) U.S. Cl.
CPC .................. *C22B 7/04* (2013.01); *B22F 9/20* (2013.01); *C01B 6/02* (2013.01); *C22B 1/02* (2013.01);
(Continued)

(58) Field of Classification Search
CPC ......... B22F 2301/205; B22F 2201/013; C22B 34/1204; C22B 34/1213; C22B 34/1259; C22B 34/1286; C22B 3/04; C22B 7/04
(Continued)

(56) References Cited

U.S. PATENT DOCUMENTS 2,205,854 A    6/1940  Kroll
2,427,338 A    9/1947  Alexander
(Continued)

FOREIGN PATENT DOCUMENTS

CN    101157990 A    4/2008
CN    101497945 A    8/2009
(Continued)

OTHER PUBLICATIONS

DuPontTm Ti-pure R-706 Titanium Dioxide. Chemours. Oct. 25, 2015. Retrieved from: https://www.chemours.com/Titanium_Technologies/en_US/products/706/index.html (Year: 2015).*
(Continued)

*Primary Examiner* — Colleen P Dunn
*Assistant Examiner* — Nicholas A Wang
(74) *Attorney, Agent, or Firm* — Thorpe North & Western, LLP

(57) ABSTRACT

A method (500) for producing a titanium product is disclosed. The method (500) can include obtaining $TiO_2$-slag (501) and reducing impurities in the $TiO_2$-slag (502) to form purified $TiO_2$ (503). The method (500) can also include reducing the purified $TiO_2$ using a metallic reducing agent (504) to form a hydrogenated titanium product comprising $TiH_2$ (505). The hydrogenated titanium product can be dehydrogenated (506) to form a titanium product (508). The titanium product can also be optionally deoxygenated (507) to reduce oxygen content.

29 Claims, 15 Drawing Sheets

Related U.S. Application Data

(60) Provisional application No. 61/867,467, filed on Aug. 19, 2013.

(51) Int. Cl.
| | | |
|---|---|---|
| *C01B 6/02* | (2006.01) | |
| *C22B 3/04* | (2006.01) | |
| *B22F 9/20* | (2006.01) | |
| *C22B 1/02* | (2006.01) | |

(52) U.S. Cl.
CPC ............ *C22B 3/04* (2013.01); *C22B 34/1204* (2013.01); *C22B 34/1213* (2013.01); *C22B 34/1259* (2013.01); *C22B 34/1268* (2013.01); *C22B 34/1277* (2013.01); *C22B 34/1286* (2013.01); *C22B 34/1295* (2013.01); *B22F 2201/013* (2013.01); *B22F 2301/205* (2013.01)

(58) Field of Classification Search
USPC .......................................................... 75/743
See application file for complete search history.

(56) References Cited

U.S. PATENT DOCUMENTS

| | | | |
|---|---|---|---|
| 2,773,787 A | 12/1956 | Rick | |
| 2,804,375 A | 8/1957 | Kamlet | |
| 2,850,379 A | 9/1958 | Hawkes | |
| 2,984,560 A | 5/1961 | Dombrowski | |
| 3,140,170 A * | 7/1964 | Henrie ................ | C22B 34/1268 75/419 |
| 3,383,184 A | 5/1968 | Kloepfer | |
| 3,472,648 A | 10/1969 | Suriani | |
| 3,721,549 A | 3/1973 | Gallay et al. | |
| 3,829,309 A | 8/1974 | Gomes et al. | |
| 3,903,239 A | 9/1975 | Berkovich | |
| 4,923,531 A | 5/1990 | Fisher | |
| 5,102,452 A | 4/1992 | Taskinen et al. | |
| 5,211,775 A * | 5/1993 | Fisher .................. | C23G 5/00 148/421 |
| 5,460,642 A | 10/1995 | Leland | |
| 5,503,655 A | 4/1996 | Joseph | |
| 5,779,761 A | 7/1998 | Armstrong et al. | |
| 5,830,420 A | 11/1998 | Borowiec et al. | |
| 6,126,712 A | 10/2000 | Holme et al. | |
| 6,152,982 A | 11/2000 | Froes et al. | |
| 6,168,644 B1 | 1/2001 | Fukasawa et al. | |
| 6,231,636 B1 | 5/2001 | Froes et al. | |
| 6,264,719 B1 | 7/2001 | Zhang et al. | |
| 6,638,336 B1 * | 10/2003 | Drozdenko ......... | C22B 34/1272 75/359 |
| 7,559,969 B2 * | 7/2009 | Sanjurjo .................. | C22B 5/12 75/359 |
| 7,585,457 B2 | 9/2009 | Zhang et al. | |
| 8,007,562 B2 | 8/2011 | Kasparov et al. | |
| 8,092,570 B2 | 1/2012 | Boulos et al. | |
| 8,328,899 B2 | 12/2012 | Adam et al. | |
| 8,388,727 B2 | 3/2013 | Klevtsov et al. | |
| 8,845,998 B2 | 9/2014 | Ishikawa | |
| 8,871,303 B2 | 10/2014 | Han et al. | |
| 9,067,264 B2 | 6/2015 | Moxson et al. | |
| 2001/0007646 A1 * | 7/2001 | Lakshmanan ......... | C22B 3/0005 423/139 |
| 2001/0019742 A1 | 9/2001 | Itsukaichi et al. | |
| 2003/0110890 A1 | 6/2003 | He et al. | |
| 2004/0103751 A1 | 6/2004 | Joseph et al. | |
| 2004/0194574 A1 | 10/2004 | Cardarelli | |
| 2005/0137078 A1 | 6/2005 | Anderson et al. | |
| 2005/0166706 A1 * | 8/2005 | Withers ............... | C22B 34/1281 75/10.23 |
| 2006/0011273 A1 | 1/2006 | Zhang et al. | |
| 2006/0174727 A1 * | 8/2006 | Bick .................... | B22F 9/20 75/364 |
| 2006/0236811 A1 | 10/2006 | Withers et al. | |
| 2007/0110655 A1 | 5/2007 | Xie | |
| 2007/0295167 A1 * | 12/2007 | Ogasawara ............... | C22B 5/04 75/620 |
| 2008/0145687 A1 | 6/2008 | Pretorius | |
| 2008/0241026 A1 | 10/2008 | Jha et al. | |
| 2009/0311154 A1 | 12/2009 | Jha | |
| 2010/0061925 A1 | 3/2010 | Lee et al. | |
| 2010/0064852 A1 | 3/2010 | Zhang | |
| 2011/0171116 A1 | 7/2011 | Klevtsov et al. | |
| 2012/0070578 A1 | 3/2012 | Han et al. | |
| 2012/0282469 A1 | 11/2012 | Nahas | |
| 2013/0220211 A1 | 8/2013 | Dutta | |
| 2013/0315773 A1 | 11/2013 | Moxson et al. | |

FOREIGN PATENT DOCUMENTS

| | | |
|---|---|---|
| CN | 101913878 A | 12/2010 |
| DE | 974210 C | 10/1960 |
| EP | 1777302 A1 | 4/2007 |
| GB | 800689 | 8/1958 |
| GB | 800689 A | 8/1958 |
| GB | 807889 | 1/1959 |
| GB | 807889 A | 1/1959 |
| JP | S49-069585 A | 7/1974 |
| JP | H01-192727 A | 8/1989 |
| JP | H03-243732 A | 10/1991 |
| JP | 2000219922 * | 8/2000 |
| JP | 2009513819 A | 4/2009 |
| JP | 2009518544 A | 5/2009 |
| JP | 2012107337 A | 6/2012 |
| JP | 2016528393 A | 9/2016 |
| KR | 10-1259434 B1 | 4/2013 |
| WO | WO 2007/097823 A2 | 8/2007 |
| WO | WO 2010/036131 | 4/2010 |
| WO | WO 2010/036131 A1 | 4/2010 |
| WO | WO 2011/106804 A1 | 9/2011 |
| WO | WO 2012/148471 A1 | 11/2012 |
| WO | WO 2013/100963 A1 | 7/2013 |
| WO | WO 2014187867 A1 | 11/2014 |
| WO | WO 2015/050637 | 4/2015 |
| WO | WO 2015/050637 A1 | 4/2015 |
| WO | WO 2015175726 A1 | 11/2015 |

OTHER PUBLICATIONS

Oh, J.M. et al. "Deoxidation of Ti powder and preparation of Ti ingot with low oxygen concentration." 2012. Materials Transactions. 53. (6). p. 1075-1077 (Year: 2012).*

Baba, M. et al. "Tantalum and niobium powder preparation from their oxides by calciothermic reduction in the molten CaCl2" 2005. Journal of Physics and Chemistry of Solids. 66. p. 466-470. (Year: 2005).*

Suzuki, R. et al. "Calcium-deoxidation of niobium and titanium in Ca-saturated CaCl2 molten salt" 1999. Journal of alloys and compounds. 288. p. 173-182 (Year: 1993).*

Rittmeyer, P. et al. "Hydrides." 2012. Wiley: Ullmann's encyclopedia of industrial chemistry. p. 103-129. (Year: 2012).*

R. Poor, S. Ruoff and T. Phillips, Furnace Atmosphere for Heat Treating, Steel Heat Treating Technologies. vol. 4B, ASM Handbook, ASM International, 2013, p. 108-134. (Year: 2013).*

Xue et al.; "Decomposition Kinetics of Titanium Slag in Sodium Hydroxide System"; Hydrometallurgy; (2009); [available online Apr. 12, 2008]; pp. 22-27; vol. 95; Elsevier.

Astrelin et al.; "Interaction of TiH$_x$ (x>2) with Solutions of some Acids and Alkalies"; In: Proceedings of the NATO Advanced Research Workshop on Hydrogen Materials Science and Chemistry of Metal Hydrides; (Sep. 20021); pp. 133-140; vol. 82; Edited by Veziroglu et al.; <doi: 10.1007/978-94-010-0600-2_14 >.

Barksdale; *Titanium: Its Occurrence, Chemistry, and Technology*; (1949); pp. 41-53; $2^{nd}$ edition; Ronald Press Co., New York.

Bolívar et al.; "Synthesis of Titanium via Magnesiothermic Reduction of $TiO^2$ (Pigment)"; In: Proceedings of European Metallurgical Conference,; EMC 2009; (Jun. 2009); 18 pages; <doi: 10.13140/RG.2.2.11374.61760 >.

(56) References Cited

OTHER PUBLICATIONS

Chen et al.; "Direct Electrochemical Reduction of Titanium Dioxide to Titanium in Molten Calcium Chloride"; Nature; (Sep. 21, 2000); pp. 361-364; vol. 407.
Crowley; "How to Extract Low-Cost Titanium: A New Process for Titanium Extraction and Production Promises to Cut Costs and Expand Applications"; Advanced Materials & Processes; (Nov. 2003); pp. 25-27.
EHK Technologies; "Summary of Emerging Titanium Cost Reduction Technologies"; A Study Performed for U.S. Department of Energy and Oak Ridge National Laboratory; (Jan. 2004); 59 pages; Vancouver, WA.
Fang et al.; "A New, Energy-Efficient Chemical Pathway for Extracting Ti Metal from Ti Minerals"; Journal of the American Chemical Society; Nov. 20, 2013); pp. 18248-18251; vol. 135; <doi: 10.1021. ja408118x >.
Froes; "The Production of Low-Cost Titanium Powders"; Journal of the Minerals, Metals, and Materials Society; (Sep. 1998); pp. 41-43; vol. 50.
Froes; "Titanium Powder Metallurgy: A Review—Part1: Titanium and its Alloys are the Materials of Choice for Many Applications, but High Cost Often Negates Their Use. Powder Metallurgy Offers a Cost-Effective Fabrication Approach"; Advanced Materials & Processes 170.9; (Sep. 2012); 6 pages; vol. 16, No. 7.
Gueguin et al.; "Chemistry and Mineralogy of Titania-Rich Slags. Part 1—Hemo-Ilmenite, Sulphate, and Upgraded Titania Slags"; Mineral Processing & Extractive Metall. Rev.; (2007); 68 pages; vol. 28.; <doi: 10.1080/08827500600564242 >.
Hartman et al.: "Producing Lower-Cost Titanium for Automotive Applications"; Journal of the Minerals, Metals, and Materials Society; (Sep. 1998); pp. 16-19; vol. 50, Issue 9; <doi: 10.1007/s11837-998-0408-1 >.
Hunter; "Metallic Titanium;"; Journal of the American Chemical Society; (1910); pp. 330-336; vol. 32.
Kikuchi et al.; "Rapid Reduction of Titanium Dioxide Nano-Particles by Reduction with a Calcium Reductant"; Journal of Physics and Chemistry of Solids; (Sep. 2014); pp. 1041-1048; vol. 75, Issue 9.
Kroll; "The Production of Ductile Titanium"; In: The Transactions of the Metallurgical Society of the American Institute of Mining; 78th General Meeting; (Oct. 3, 1940); pp. 35-47.
Lasheen; "Soda Ash Roasting of Titania Slag Product From Rosetta Ilmenite"; Hydrometallurgy; (2008); pp. 124-128; vol. 93; <doi: 10.1016/j.hydromet.2008.02.020 >.
Lin; "The Effect of Alkali Salt Catalyst on the Carbothermic Reduction of Nickel Oxide"; Metallurgical Transactions B; (Aug. 1988); pp. 685-686; vol. 19B.
Middlemas et al.; "A New Method for Production of Titanium Dioxide Pigment"; Hydrometallurgy; (2013); pp. 107-113; vol. 131-132; <doi:10.1016/j.hydromet.2012.11.002 >.
Middlemas; "Energy-Conscious Production of Titania and Titanium Powders from Slag"; University of Utah; (Dec. 2014); 212 pages.
Nersisyan et al.; "Direct Magnesiothermic Reduction of Titanium Dioxide to Titanium Powder through Combustion Synthesis"; Chemical Engineering Journal; (2014); pp. 67-74; vol. 235.
Oh et al.; "Deoxidation of Ti Powder and Preparation of Ti Ingot with Low Oxygen Concentration"; Materials Transactions; (Apr. 18, 2012); pp. 1075-1077; vol. 53, No. 6; <doi: 10.2320/matertrans. M2012004 >.
Oh et al.; "Preparation of Low Oxygen Content Alloy Powder from Ti Binary Alloy Scrap by Hydrogenation-Dehydrogenation and Deoxidation Process"; Journals of Alloys and Compounds; (2014); pp. 61-66; vol. 593; <doi: 10.1016/j.jallcom.2014.01.033 >.
Okabe et al.; "Titanium Powder Production by Preform Reduction Process (PRP)"; Journal of Alloys and Compounds; (2004); pp. 156-163; vol. 364; <doi: 10.1016/S0925-8388(03)00610-8 >.
Rao et al.; "Catalysis by Alkali Carbonates of Carbothermic Reduction of Magnetite Concentrates"; Ironmaking and Steelmaking; (1984); pp. 308-318; vol. 11, No. 6.
Suzuki et al.; "Calcium-Deoxidation of Niobium and Titanium in Ca-Saturated $CaCl^2$ Molten Salt"; Journal of Alloys and Compounds; (1999); pp. 173-182; vol. 288.
Vuuren et al.; "Opportunities in the Electrowinning of Molten Titanium from Titanium Dioxide"; Journal of the Minerals, Metals, and Materials Society; (Oct. 2005); pp. 53-55.
Won et al.; "Titanium Powder Prepared by a Rapid Exothermic Reaction"; Chemical Engineering Journal; (2010); pp. 270-275; vol. 157; <doi: 10.1016/j.cej.2009.12.030 >.
Xu et al.; "Behavior of Calcium Chloride in Reduction Process of Titanium Dioxide by Calcium Vapor"; Journal of Alloys and Compounds; (2013); pp. 208-214; vol. 576; <doi: 10.1016/j jallcom. 2013.04.107 >.
Xue; "Production of Titanium Dioxide by Decomposition of Titanium Slag with Molten Sodium Hydroxide"; Dalian University of Technology; (2009); 2 pages.
Zhang et al.; "A Literature Review of Titanium Metallurgical Processes"; Hydrometallurgy; (2011); pp. 177-188; vol. 108; <doi: 10.1016/j.hydromet.2011.04.005 >.
Zhang et al.; "A Novel Preparation of Titanium Dioxide from Titanium Slag"; Hydrometallurgy; (2009); pp. 52-56; vol. 96; <doi: 10.1016/j.hydromet.2008.08.002 >.
Zheng et al.; "Production of Titanium Powder by the Calciothermic Reduction of Titanium Concentrates or Ore Using the Preform Reduction Process"; Materials Transaction; (2007); pp. 2244-2251; vol. 48, No. 8; <doi: 10.2320/matertrans.MER2007115 >.
Supplementary European Search Report dated Jun. 25, 2019, in EP Application No. 17750888.4, filed Feb. 10, 2017; 3 pages.

* cited by examiner

METHODS OF PRODUCING A TITANIUM PRODUCT

RELATED APPLICATIONS

This application is a continuation-in-part application of PCT International Application No. PCT/US14/51621, filed Aug. 19, 2014, which claims the benefit of U.S. Provisional Patent Application Ser. No. 61/867,467, filed Aug. 19, 2013, which are each incorporated herein by reference.

GOVERNMENT INTEREST

This invention was made with government support under Grant No. DE-AR0000420 awarded by U.S. Department of Energy. The government has certain rights in the invention.

BACKGROUND

Titanium is strong, light weight, corrosion resistant, and biocompatible. This unique combination of properties makes it a valuable natural resource well suited for numerous potential commercial applications. Titanium has been manufactured commercially since at least 1948 and is broadly used in the aerospace, medical, and military defense industries. For example, the U.S. Geological Survey, Mineral Industry Surveys on titanium, reports that approximately 67% of mill products and castings during 2011 were used in commercial and military aerospace applications. Yet, other industries where titanium's properties would be useful still rely heavily upon general purpose steel. Heavy dependence on steel is not surprising because producing titanium by conventional methods can be twenty times more expensive than producing steel. Much of this high cost is due to the indirect nature of known processes, which are time-intensive and require high amounts of energy, as illustrated and discussed with reference to FIGS. 1-4 below.

FIG. 1 illustrates a conventional titanium production method 100. At stage 101, $FeTiO_3$, also referred to as ilmenite, a natural ore, is reduced to a titanium rich slag ($TiO_2$-slag) and pig iron (pig Fe) by a carbothermal process. At stage 102, chemical extractive metallurgy processes are utilized to remove some unwanted impurities and produce an upgraded $TiO_2$ (also referred to as synthetic rutile). At stage 103, synthetic rutile is chlorinated with chlorine under high temperature (typically in the range of 800 to 1000° C.) to form titanium tetrachloride ($TiCl_4$). Two well-known commercial processes have been used to process $TiCl_4$: Kroll and Hunter.

The Hunter process 104, as originally practiced and developed by metallurgist and professor Matthew Hunter at the Rensselaer Polytechnic Institute, involves reducing $TiCl_4$ with elemental sodium in a sealed steel pot under high temperature (approximately 900° C.) and pressure, to form titanium sponge and molten sodium chloride. Subsequently, the Hunter process was updated to a two stage process. In stage one of an updated Hunter process 104, $TiCl_4$ is reduced with sodium to $TiCl_2$, discharged from the first reactor, and fed with molten salt to a second stage batch reactor (over a furnace and under inert gas atmosphere) where it is combined with molten sodium to complete reduction to titanium sponge. After the reaction completes and the sealed pot cools, salt is washed away with hydrochloric acid solution and then dried. While the Hunter process 104 can theoretically make highly pure titanium metal, it is inefficient, time consuming, and costly, and therefore impractical for many industries.

The Kroll process 105, was developed by Wilhelm Kroll as an alternative to the Hunter process 104, and is described in U.S. Pat. No. 2,205,854 (issued Jun. 25, 1940). According to the Kroll process 105, $TiCl_4$ is reduced with magnesium metal at atmospheric pressure and temperatures above 800° C. An inert gas is employed with the magnesium reducing agent in the reactor. Chips of metal bored from the reactor are treated with water and hydrochloric acid to remove magnesium chloride ($MgCl_2$). It has been reported that the Kroll process took nearly 10 years to scale-up into a commercial production process.

In more recent history, particularly the past 20 years, research has continued in attempts to identify more economical methods of producing titanium. FIG. 2 illustrates one such method known as the Armstrong process 200. This process 200 begins at stage 201, where ilmenite ore undergoes carbothermal reduction to Ti-slag and pig Fe, followed by chemical extraction at stage 202, and high temperature chlorination of upgraded synthetic rutile to $TiCl_4$ at stage 203. Stage 204 is a continuous process for reduction of $TiCl_4$ using molten sodium (Na) metal. Although the Armstrong process presents some advantages over the Hunter and Kroll processes, a number of challenges remain. In one aspect, the Armstrong process results in a Ti powder having the consistency of mini sponges, making subsequent processes, such as compacting and sintering, difficult. In another aspect, molten sodium is a costly material and regenerating Na (from NaCl) is an energy intensive process. Furthermore, the Armstrong process still requires $TiCl_4$. Therefore, the benefits of the Armstrong process are limited.

Subsequent to Kroll and Hunter, methods have been developed that modify the number of steps required to process titanium. One example, illustrated in FIG. 3, is the FCC Cambridge process. Method 300 begins at stage 301 where ilmenite ore undergoes carbothermal reduction to Ti-slag and pig Fe followed by chemical extraction at stage 302. At stage 303, the FCC Cambridge process uses electrolysis to electrochemically reduce upgraded synthetic rutile to Ti sponge or powder.

In January of 2004, the U.S. Department of Energy and Oak Ridge National Laboratory (ORNL) released a report titled "Summary of Emerging Titanium Cost Reduction Technologies," in which it identified and described sixteen emerging titanium reduction processes. Despite considerable effort and financial support, such efforts have not been widely adopted, nor proven to be commercially useful in many instances for a variety of reasons.

As described above, the existing technologies, including both commercial and developmental processes, can be broadly segmented into two groups: (1) processes employing reduction of $TiCl_4$, and (2) processes employing reduction of $TiO_2$ to indirectly produce titanium. The emphasis of research of reduction of $TiCl_4$ has largely focused on optimizing the $TiCl_4$ reduction process. The emphasis of research by reduction of $TiO_2$, in contrast, has largely focused on avoidance of high-temperature chlorination. Nonetheless, both segments and related research still require chemical extractive processes to obtain the upgraded (highly refined) rutile feed to subsequent process steps—also a costly step.

None of the aforementioned methods provide a method of titanium production that adequately improves the economic viability of titanium metal. FIG. 4 illustrates typical costs associated with conventional production of titanium. Magnesium and sodium reduction processing (e.g., Hunter process 103 and Kroll process 104 of FIG. 1) represent approximately 66% of total production costs. Chlorination to form TiCl$_4$ represents about 24% of the total production costs, with the remaining 10% attributable to production of upgraded rutile. Thus, there remains a need for a simplified and reduced cost method for the production of titanium metal.

SUMMARY

The present disclosure is directed to methods for producing a titanium product, such as titanium powder or sponge. In one example, a method can comprise obtaining a TiO$_2$ rich material, reducing impurities in the TiO$_2$ rich material to produce a purified TiO$_2$, reducing the purified TiO$_2$ using a metallic reducing agent at a temperature and a pressure to produce a hydrogenated titanium product that includes TiH$_2$ and optionally elemental titanium, and dehydrogenating the hydrogenated titanium product to form the titanium product. Typically, the titanium product can also be deoxygenated to further reduce oxygen content of a final titanium product. Most often oxygen content can be reduced to less than 0.2%.

In one aspect, the method can comprise alkaline roasting the TiO$_2$ rich material to remove impurities from the slag. In another aspect, impurities, especially silica content, can be further reduced by desilicating the product of alkaline roasting and water washed TiO$_2$ rich material. In another aspect, impurities, such as but not limited to iron (Fe), can be further reduced by hydrolyzing the TiO$_2$ rich material after it has been alkaline roasted, water washed, and desilicated during the process to form a titanic acid which is then calcined to form the purified TiO$_2$. The purified TiO$_2$ can be reduced using a metallic reducing agent at a temperature and a pressure to produce a titanium product comprising titanium hydride and typically elemental titanium.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
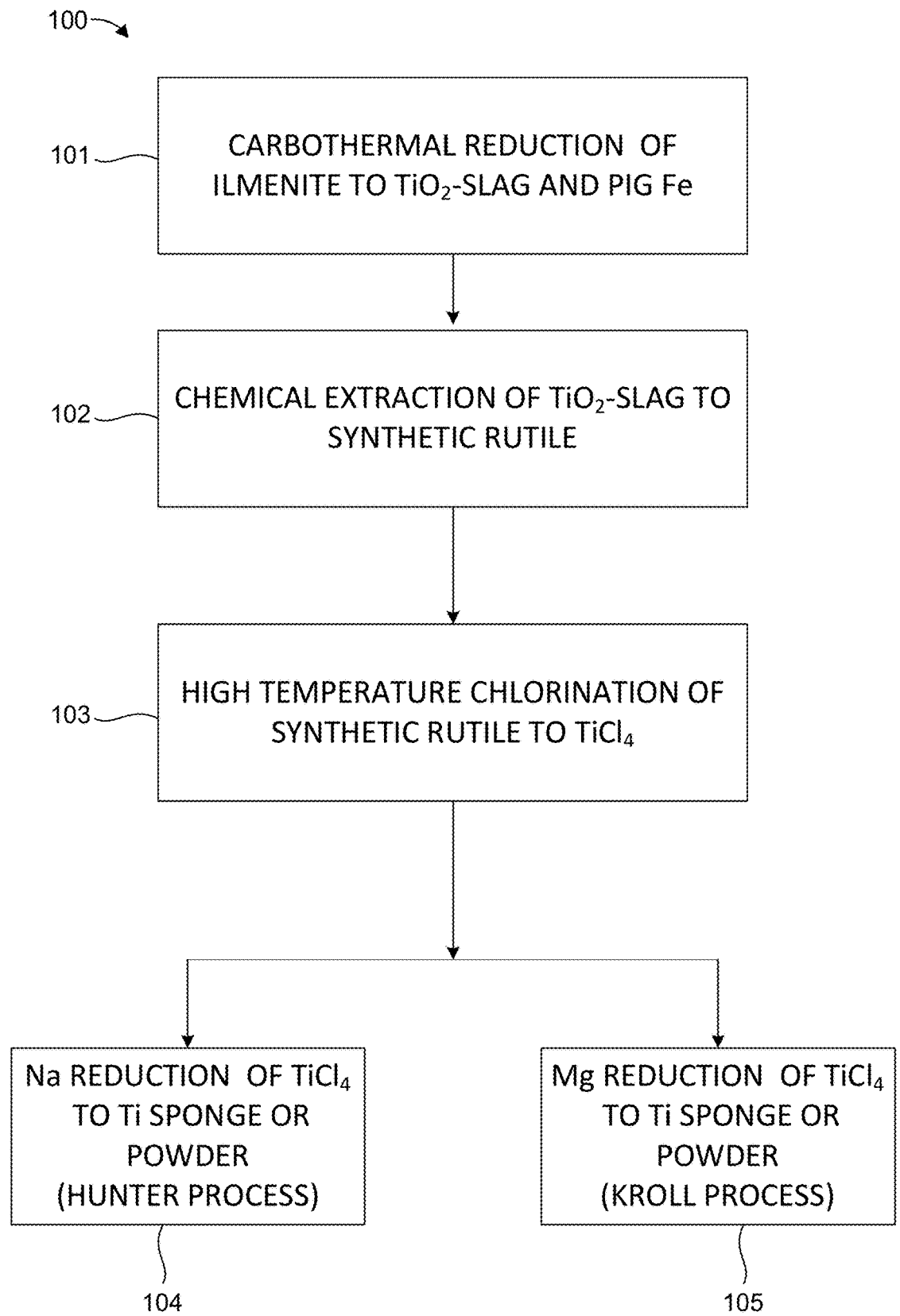
FIG. 1 is a process flow diagram illustrating conventional titanium production processes including Hunter and Kroll reductions.
Figure 2:
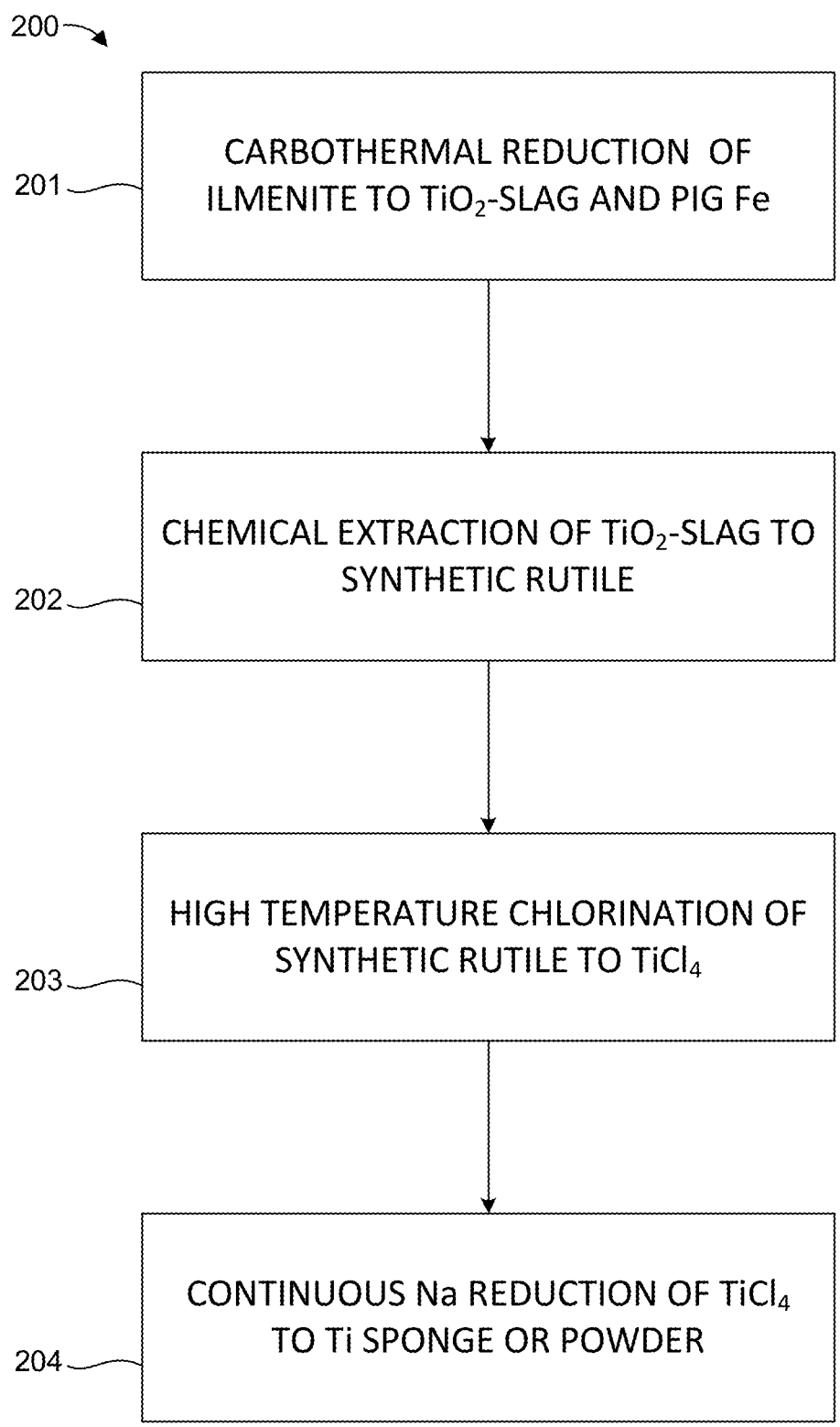
FIG. 2 is a process flow diagram illustrating the Armstrong process for production of titanium sponge or powder.
Figure 3:
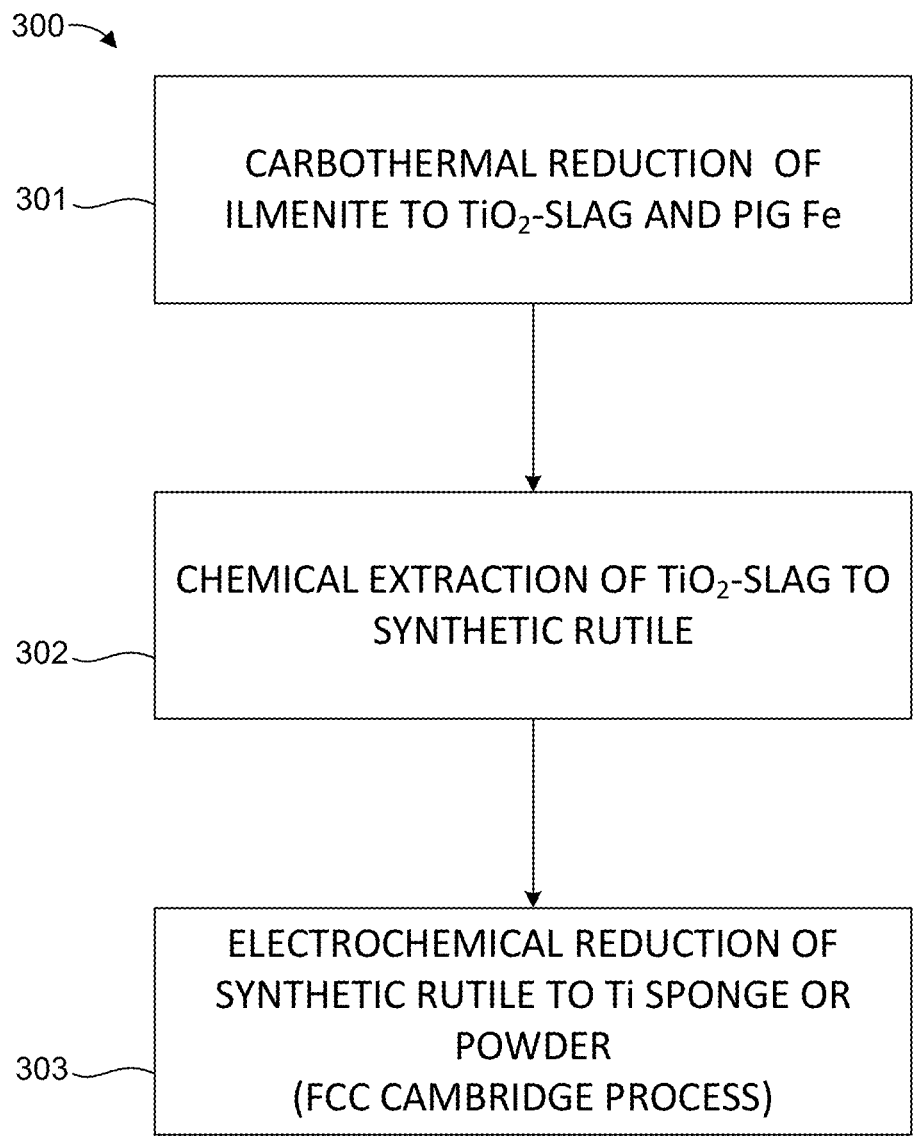
FIG. 3 is a process flow diagram illustrating the FCC Cambridge process for production of titanium sponge or powder.
Figure 4:
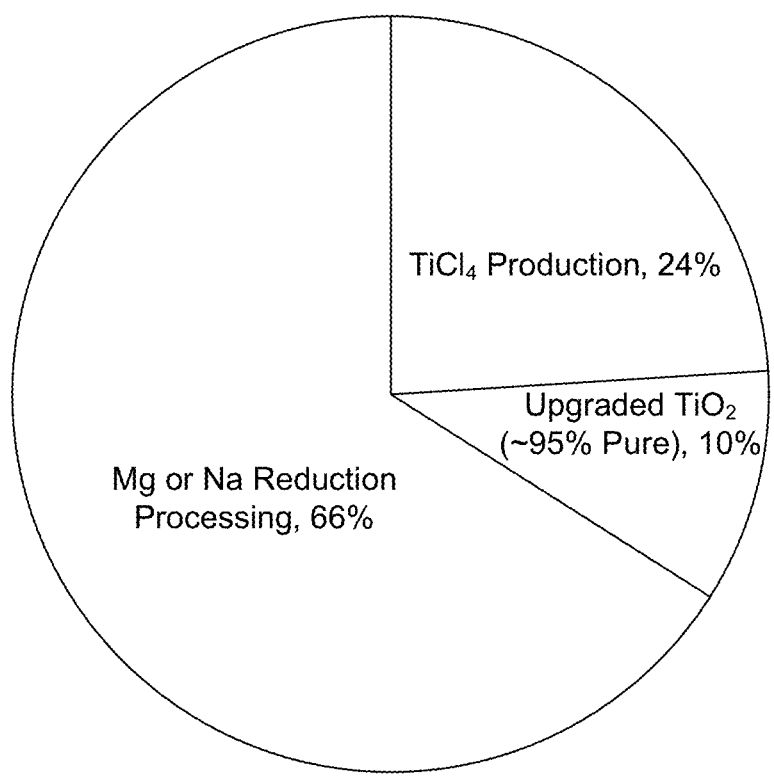
FIG. 4 is a pie chart which illustrates typical costs associated with conventional production of titanium.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a reducing agent" includes reference to one or more of such materials and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "$TiO_2$ rich material" includes any $TiO_2$ containing material having a $TiO_2$ content of at least 70 wt %. As such, $TiO_2$ rich material can include $TiO_2$-slag, upgraded $TiO_2$ slag, and purified $TiO_2$ as discussed in more detail herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Figure 5:
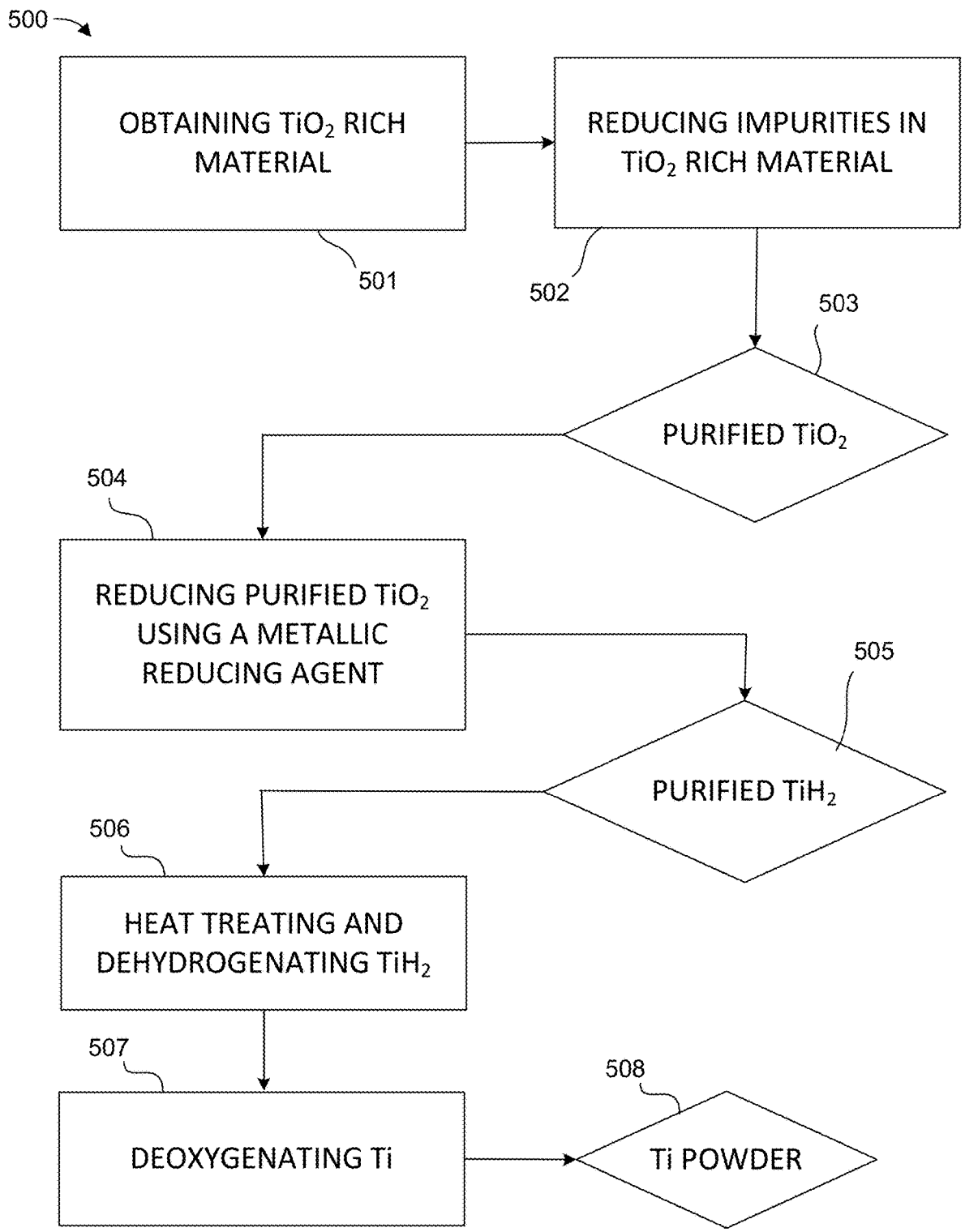
FIG. 5 illustrates a method for producing a titanium product in accordance with an example of the present disclosure.

Referring generally to FIG. 5, a method 500 of producing a titanium product 508 can include obtaining $TiO_2$ rich material 501. As used herein, "$TiO_2$ rich material" can include upgraded $TiO_2$-slag (UGS) and non-upgraded $TiO_2$-slag as described in more detail herein Impurities in the $TiO_2$ rich material are reduced 502 to form a purified $TiO_2$ 503. The purified $TiO_2$ is then reduced using a metallic reducing agent 504 at a temperature and pressure suitable to form $TiH_2$ and optionally elemental Ti 505. The $TiH_2$ is then heat treated 506 to reduce pores and dehydrogenate the $TiH_2$ to form a Ti powder product 508. Although titanium product quality can vary, the $TiH_2$ powder as a result of the reduction by Mg in hydrogen often contains approximately 1.0 wt % of oxygen. This oxygen content remains after the heat treatment 506 described herein. At this level of oxygen, the material is Ti—O solid solution. However, it is often desirable that an oxygen content in Ti product is less than 0.2%, and in many cases between 0.01 to 0.15 wt %. Therefore, the oxygen in the titanium powder after Mg reduction and heat treatment according to this aspect can be further reduced. Thus, in some cases, the heat treatment 506 can be followed by a deoxygenation stage 507 to produce product with oxygen content less than 0.2 wt %, and often less than 0.15 wt % oxygen.

Figure 6:
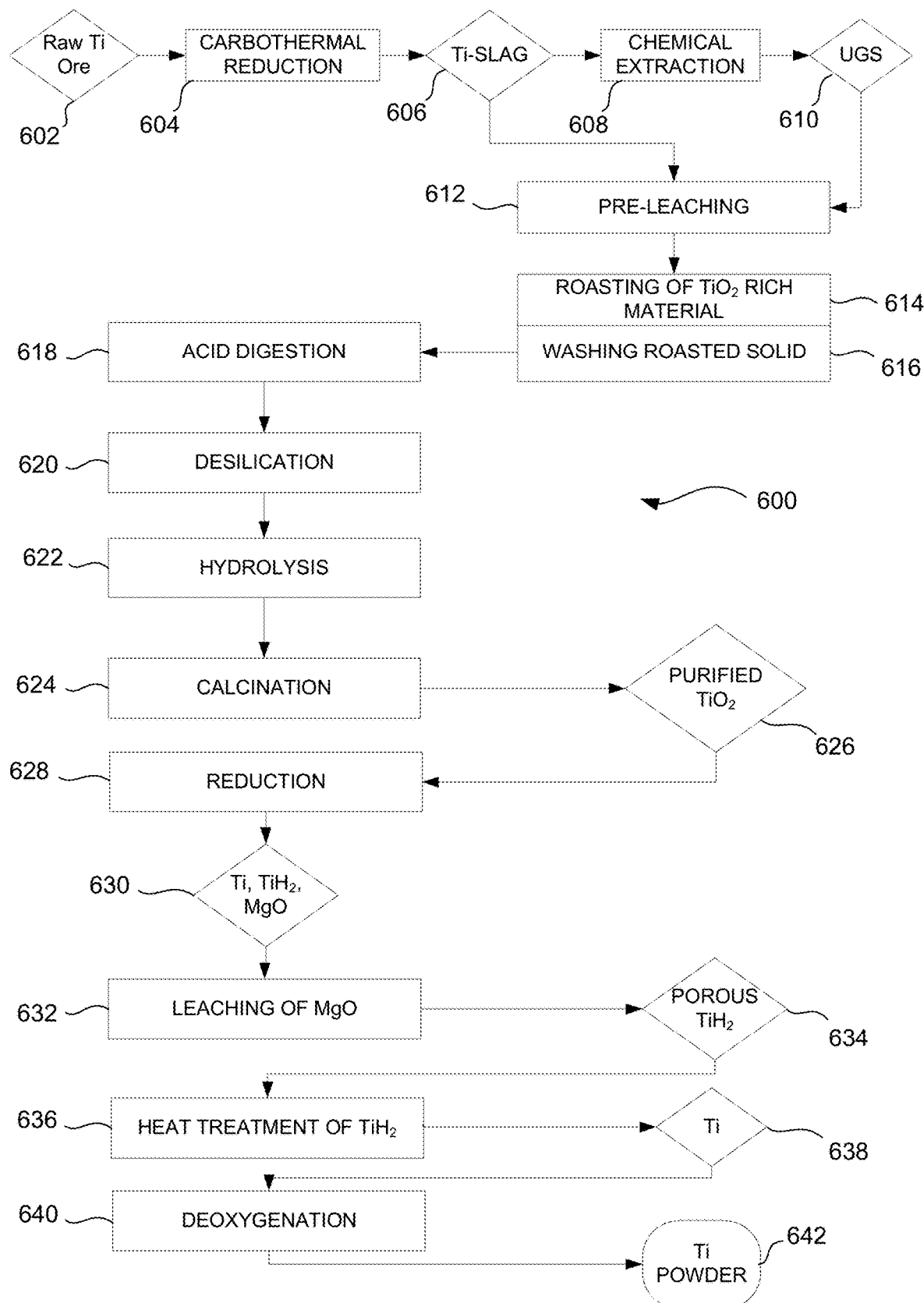
FIG. 6 is a flow diagram which illustrates a method for producing a titanium product in accordance with another example of the present disclosure.

FIG. 6 illustrates a more specific example of a method 600 of producing a titanium product in accordance with still another example of the present disclosure. A variety of raw materials may be employed in the present method, including natural materials extracted from the earth and/or pre-processed materials, such as natural rutile ($TiO_2$), ilmenite ($FeTiO_3$), and leucoxene (an alteration product of titanium containing minerals). Such materials may be composed of varying degrees of titania. A raw titanium ore starting material can be treated to increase titanium percentage. Typically, raw ore can have a titanium oxide content from about 50 to about 65 wt %. Although other methods can be used, raw ore 602 can be carbothermally reduced 604 to form $TiO_2$-slag 606. Such low grade $TiO_2$-slag can often contain about 80 wt % titanium oxide, although from about 70 to 90 wt % may be achieved under varying feed and processing conditions. Specific conditions can vary, however as a general guideline, such carbothermal reduction can include heating to a temperature from about 1000° C. to 1600° C. The result is $TiO_2$-slag, which in addition to $TiO_2$ includes other reaction products or impurities, such as pig Fe.

In one specific example, Rio Tinto QIT (trade name of SORELSLAG). The slag is a solid-solution of various titanate compounds with a pseudobrookite structure. The relative proportion of compounds within the primary phase is $(FeTi_2O_5)_{0.31}(MgTi_2O_5)_{0.30}(Ti_3O_5)_{0.31}(Al_2TiO_5)_{0.06}(MnTi_2O_5)_{0.008}$.

The $TiO_2$-slag can be optionally further purified to form an upgraded slag (UGS). UGS is typically produced by purifying regular Ti-slag by a series of leaching processes. UGS is similar in $TiO_2$ content to another industrial product that is called "synthetic rutile." For convenience of this application, the term $TiO_2$ rich material implies all those concentrated Ti minerals that could be used as the raw material for the processes described in this specification. In one example, the $TiO_2$-slag can be subjected to a chemical extraction process 608 to form UGS 610. The UGS can often have a titanium oxide content greater than about 90 wt %, and in some cases greater than 96 wt %. Such processes of forming $TiO_2$-slag and UGS are well known to those skilled in the art.

A low grade $TiO_2$-slag can generally be a solid-solution of various oxide compounds, and the total $TiO_2$ content of typical $TiO_2$-slag is 78.5%, with FeO, MgO, $SiO_2$, and $Al_2O_3$ contents of 9.8, 5.6, 2.8, and 2.4%, respectively. In one aspect, the slag can be UGS with $TiO_2$ content higher than that of typical low grade $TiO_2$-slag and impurity contents lower than those of typical $TiO_2$-slag. For example, UGS can have higher $TiO_2$ content (e.g. 94.5%) and thus much lower impurities, such that less energy consumption is required in subsequent steps of the process discussed below.

Instead of reducing $TiO_2$-slag directly, purer $TiO_2$ obtained from alkaline roasting $TiO_2$-slag (including upgraded $TiO_2$-slag) is reduced. Thus, in one aspect, low grade $TiO_2$-slag or upgraded $TiO_2$-slag can be purified by an alkaline roasting process 614 before subjected to direct reduction process 628. In yet another example, the $TiO_2$ rich material can be obtained commercially as a purified $TiO_2$.

Optionally, the $TiO_2$ rich material can be subjected to a pre-leaching stage 612 to at least partially remove silica in the material. In one example, an aqueous NaOH solution can be used to solubilize a portion of impurities such as, but not limited to, silica, and the like. In one example, the NaOH solution can be about 40-600 g/l. Typically, pre-leaching can occur from room temperature to 110° C.

The alkaline roasting process 614 can include NaOH roasting of $TiO_2$-slag 606 or upgraded $TiO_2$-slag 610. Roasted solid can then be washed 616. The roasting and water washing processes can leach impurities including Si, Al, Cr and V by forming sodium metallate salts of these elements. The metallates of these elements are soluble in water and alkaline solution and therefore can be readily removed during washing with water. For example, a mixture of $TiO_2$-slag (or upgraded $TiO_2$-slag) and NaOH can be heated up to an elevated roasting temperature around 450-650° C. and held at that temperature for a period of time to allow the transformation of $TiO_2$ in the slag into sodium titanate and the transformation of the major impurities such as Si and Al in the slag into soluble salts. Notably, sodium titanate is insoluble in water, although readily dissolved in a weak acid. The alkaline roasting process 614 can also include washing roasted solid with water 616 to remove sodium and get a titanium containing solid including titanic acid along with remaining insoluble impurities such as, but not limited to, $Fe(OH)_3$, $Ca(OH)_2$, $Mg(OH)_2$ and unreacted silica. During both optional pre-leaching 612 and the alkaline roasting 614, silica reacts with NaOH to form sodium silicate which is soluble in water and alkaline solution. Therefore, sodium can be at least partially removed by washing with water after the roasting process. Although specific performance can vary, most often at least 75% of sodium is removed during washing (e.g. about 80%).

The washed solids can then be subjected to acid digestion 620. The washed solids can be exposed to a concentrated acid such as HCl, $H_2SO_4$, and the like. Overall the purpose of digestion of the solid using acid solution is to prepare a solution for following steps. For example, in order to further reduce silica content, concentrated acid can be used so that the concentration of Si is relatively high, which makes it easier to capture and remove Si, i.e. the desilication step. After desilication, the solution can be diluted to a concentration that is optimized with respect to hydrolysis, e.g. the selective precipitation of titanic acid. During the selective precipitation of titanic acid, impurities such as Fe will remain in the solution, thus accomplishing the goal of reducing impurities such as Fe in Ti containing intermediates.

Furthermore, depending on initial feed quality and desired final titanium product quality, silicon can be removed. In some cases Si content in a final Ti product 642 can be less than about 0.1 wt %, and in some cases less than 0.04 wt %. Accordingly, an optional desilication stage 620 can be performed after acid digestion 618 which is done after roasting 616 to further reduce silica content, but before hydrolysis 622. As a general guideline, it can be desirable to reduce silica content in the roasted solids to less than 0.04 wt %, and often less than 0.015 wt %. Thus, desilication can be omitted, especially when the feed material has a sufficiently low native silica content.

Without the specific desilication step, when the solid powder from roasting is dissolved in acid solution 618 in preparation for hydrolysis, any silica component existing in the acid dissolved solution will precipitate spontaneously with titanic acid. The amount of silica remaining in the material can be measured using the mass ratio of Si/Ti in the solution prior to the hydrolysis. In some cases, data has shown that a Si/Ti ratio in the solution was higher than 0.0004 (0.04%/99.7%≈0.0004), which will be even higher in hydrolyzed $TiO_2$. Therefore, the desilication stage 620 can be useful to reduce the silica content in the material further.

In one example, desilication includes reagents of surface active silica gel and flocculant. The main component in silica gel is ortho-silicic acid ($H_4SiO_4$), which is prepared and preserved by mixing with water to maintain its activity. A suitable silica gel can be prepared by roasting $SiO_2$ powder mixed with NaOH powder to form sodium silicate. In one example, silica roasting can be performed at 500-700° C. for 0.5-2 hours, with a mass ratio of $SiO_2$ to NaOH of about 3:4. The sodium silicate can be dissolved using water. In one example, a mass ratio of $SiO_2$ to water of 1:9 can be used. Undissolved particles can be filtered and the $Na_2SiO_3$ solution is neutralized with HCl acid until the pH value reaches 7. The solution before neutralization is free of suspensions. After the neutralization, the solution develops fresh $H_4SiO_4$ particle suspensions. This solution is then ready and can be used directly as the desilication reagent.

Without begin bound to a specific theory, it is thought that silica gel works to reduce silica content in the dissolved solution which is a $Ti^{4+}$ bearing solution as follows: The 3D structure of ortho-silicic acid has exposed —OH, which can form hydrogen bonds with the silicate in the acid solution, therefore capturing the silica. To aid in agglomeration of small ortho-silicic acid particles and inhibit their re-dissolution, a water-soluble flocculant can be added. The flocculant can also have exposed —OH, which can have an adsorption effect with hydroxyl on silica gel through forming hydrogen bonds. The molecular weight of the flocculant is usually high to form even larger 3D structures and to increase the stability of silica gel in the strong acid solution. One typical flocculant that can be used is PEG 600, although other non-limiting examples can include PEG 400, PEG 3000, and the like. Although conditions may vary, from about 0.1 wt % to 10 wt % flocculant can be used such as about 1 wt % of flocculant in solution.

Parameters which can affect efficiency of desilication include temperature, time, and concentrations of silica gel and flocculant. One specific example of desilication includes dissolving the solid roasted and washed powder in concentrated HCl solution at 50° C. for 0.5-2 hours, until it reaches almost complete dissolution. For a ~400 mL acid dissolved solution, ~100 grams of silica gel slurry and 8 mL of flocculant solution are added and stirred for 2-4 hours from room temperature to 50° C. The slurry can be filtrated, such that the obtained transparent acid solution is desilicated $Ti^{4+}$ bearing solution, which is ready for dilution to a set concentration level for hydrolysis.

Although the above desilication step can be particularly useful, other techniques can be used to reduce silica content. Non-limiting examples of desilication techniques can include adsorption (including silica gel and flocculant) and precipitation. Precipitation is generally performed at high temperatures of 110-130° C. in a sealed reactor, at a relatively high pressure which may precipitate titanium. Generally, desilication can be performed prior to reduction 628, and most often prior to hydrolysis 622, although desilication can be performed at other stages as well.

As the next step, the roasted and optionally desilicated material can be prepared as a solution that is conditioned for the next step of hydrolysis 622. This can be achieved by diluting the solution that is carried over from the desilication. The solution is formed by mixing the $Ti^{4+}$ bearing solution with HCl to form a titanium chloride solution. Note, transition metals such as iron (Fe) and Ti, however, do not form water or alkaline soluble compounds during the alkaline roasting. Thus, the acid digestion step 618, which is a part of the preparation for desilication 620, can further dissolve Fe along with titanate ($TiO_3^{2-}$). After the desilication step and after the solution is diluted, Fe remains in a dilute HCl solution. Although concentrations can vary, a dilute HCl solution can typically range from 3 to 12 M/L for the specific purpose of this process, and in some cases about 6 mol/L. Optionally, acid digestion and/or conditioning can be accomplished using other suitable acids such as, but not limited to, $H_2SO_4$, $HNO_3$, and the like.

The solution prepared according to the above can be followed by hydrolysis 622. More specifically, hydrolysis 622 can then be instigated to selectively precipitate titanic acid and thereby separate Ti from other impurities. The dissolved Fe does not co-precipitate with Ti and thus is left in the leaching solution. Additionally, the hydrolysis process is not only a purification technique, but can also be a process for controlling particle size and morphologies of the product powder. In order to minimize oxygen content in the final powder, the hydrolysis process parameters can be adjusted to produce relatively coarse titanic acid particles. The coarse titanic acid particles can generally have a size from about 1 µm to about 100 µm, in some cases from 3 µm to 80 µm, and in other cases from 20 µm to 60 µm. Several parameters during hydrolysis which affect particle size include free acid concentration in the solution, temperature, agitation, and time. This highly purified solid titanic acid can then be subjected to calcination 624 to transform the particles into corresponding highly purified, porous, and coarse $TiO_2$. This is thought to be the result of removal of water to form pores. Regardless, coarse $TiO_2$ can generally range from about 1 µm to about 100 µm, in some cases from 3 µm to 80 µm, and often from 20 µm to 60 µm, and in some cases about 30 µm. Similarly, the purified $TiO_2$ can have a specific surface area from 10 $m^2$/g to 100 $m^2$/g, and in some cases from 30 $m^2$/g to 50 $m^2$/g (as measured by BET). The size of the pores of the purified $TiO_2$ particles is often in the nanoscale. Because of these pores, the specific surface area of the porous $TiO_2$ powder after hydrolysis and calcination is extremely high. The size and morphology of the porous $TiO_2$ is inherited in $TiH_2$ produced by Mg reduction in hydrogen. As such, the $TiH_2$ particles after reduction are also porous, although a non-porous $TiO_2$ may also produce porous $TiH_2$ at a lower reduction rate and efficiency. Furthermore, the purified $TiO_2$ can be greater than 99 wt % $TiO_2$, and often greater than 99.5 wt % $TiO_2$ prior to reduction.

The purified $TiO_2$ material can then be exposed to a metallic reducing agent to directly produce the titanium product chemically separated from metal impurities. For example, the purified porous titanium oxide can be subjected to a direct reduction process 628 to produce titanium hydride or titanium powder. Chemically separated indicates that the titanium is not alloyed or chemically bond with other metal impurities. Direct reduction can be implemented by placing the purified $TiO_2$ in a temperature controlled vessel at low pressure and mixing it with a metallic reducing agent in a hydrogen atmosphere. Temperature control can generally be within a range of about 500 to about 1200° C. The low pressure can typically range from 0.1 atm to 10 atm, and in some cases about 1 atm. In one aspect, the metallic reducing agent includes Mg, $MgH_2$, and/or $CaH_2$. Although described in more detail herein, the metallic reducing agent can be introduced in at least stoichiometric amounts, and in some cases up to about 6 times the mole amount of Ti.

Equations (1) through (8) are provided below to illustrate potential reactions for the direct reduction of purified $TiO_2$ with a metal or metal hydride reducing agent. In equations (1) through (8), purified $TiO_2$ (containing $TiO_2$) is combined with a Mg or $MgH_2$ reducing agent in the presence of hydrogen gas. In one embodiment, the reduction stage 628 proceeds at relatively low temperature, for example, between 400 and 900° C., or between 700 and 1200° C., and produces a reaction product. The reaction product typically includes titanium hydride (see equations (1) through (4)). At a relatively higher temperature, for example, between 700 and 1200° C., reduction reaction product includes elemental titanium (see equations (5) and (8)).

$$TiO_2 + 2Mg + H_2 \rightarrow TiH_2 + 2MgO \quad (1)$$

$$FeTiO_3 + 3Mg + H_2 \rightarrow TiH_2 + 3MgO + Fe \quad (2)$$

$$TiO_2 + 2MgH_2 \rightarrow TiH_2 + 2MgO + H_2 \quad (3)$$

$$FeTiO_3 + 3MgH_2 \rightarrow TiH_2 + 3MgO + Fe + 2H_2 \quad (4)$$

$$TiO_2 + 2Mg \rightarrow Ti + 2MgO \quad (5)$$

$$FeTiO_3 + 3Mg \rightarrow Ti + 3MgO + Fe \quad (6)$$

$$TiO_2 + 2MgH_2 \rightarrow Ti + 2MgO + 2H_2 \quad (7)$$

$$FeTiO_3 + 3MgH_2 \rightarrow Ti + 3MgO + Fe + 3H_2 \quad (8)$$

Although not shown in equations (1) through (8) above, it is understood that even the purified $TiO_2$ may likely contain elements in addition to $TiO_2$. These additional materials may include, for example, iron (Fe), magnesium (Mg), calcium (Ca), aluminum (Al), silicon (Si), and vanadium (V). Therefore, reduction reaction product will typically include a physical mixture of $TiH_2$ or Ti metal and various impurities. However, it should be emphasized, because the reduction is conducted using the purified $TiO_2$ as the feed material, the amount of impurities and their reaction products are very small, and often negligible. Thus, in one aspect, the purification process includes alkaline roasting, digestion, desilication, and hydrolysis steps to get even further purified $TiO_2$ feedstock before subjected to direct reduction process.

Figure 7:
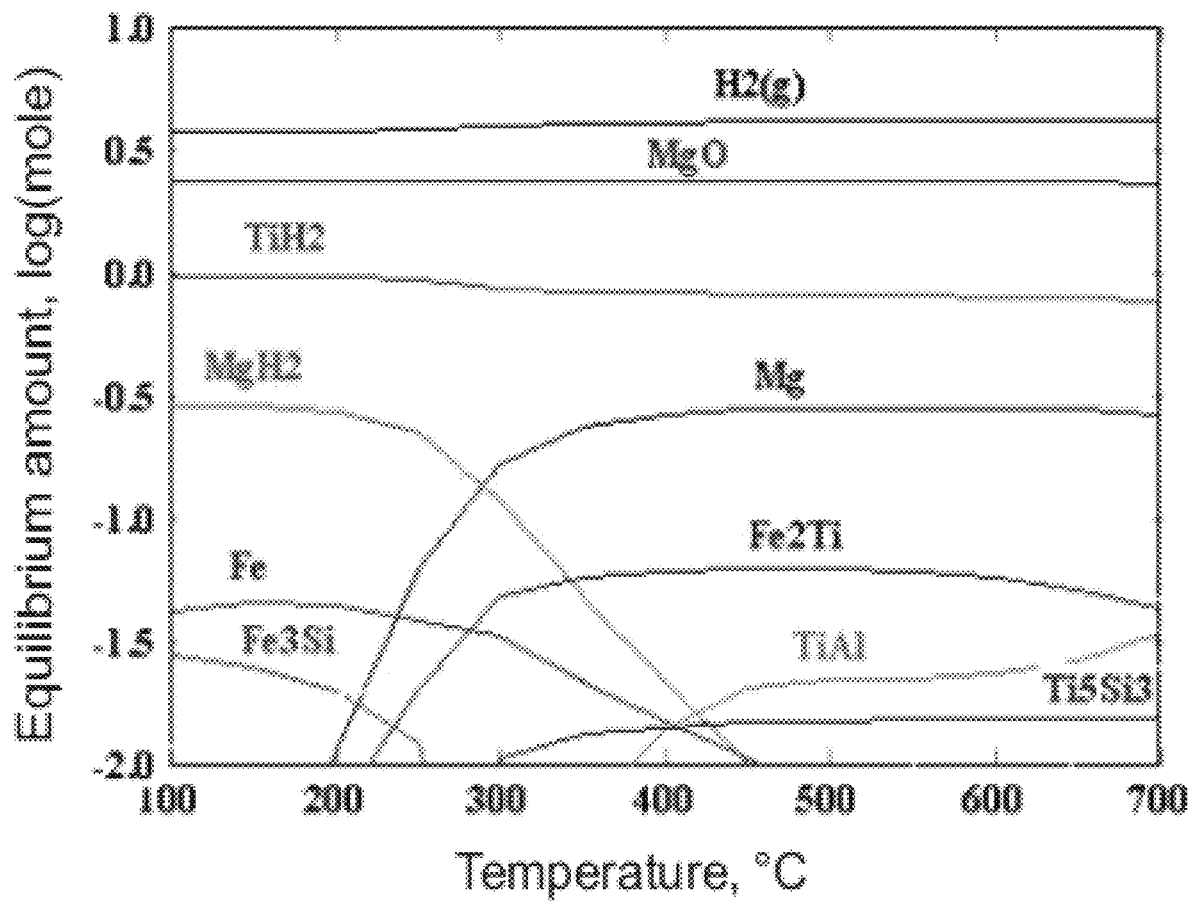
FIG. 7 illustrates relative amounts of various reaction products from a direct reduction of TiO$_2$-slag by a magnesium or magnesium hydride reducing agent in accordance with an example of the present disclosure.

FIG. 7 illustrates potential relative amounts of various reaction products resulting from the direct reduction of purified $TiO_2$ by a Mg or $MgH_2$ reducing agent. Such impurities are very low in purified $TiO_2$ and are also typically extremely low in the reduced product. Nonetheless, FIG. 7 shows several possibilities of the reaction products involving those impurities.

According to this invention, when Mg is used to react with purified $TiO_2$ under hydrogen, $TiH_2$ is formed. By forming $TiH_2$, Ti is chemically separated from other impurities. The thermodynamic driving force for reduction of $TiO_2$ using Mg can be significantly improved in the presence of hydrogen. Additionally, forming $TiH_2$, rather than Ti metal, is advantageous because Ti metal is more prone to forming alloys with other elements such as Fe, which can be difficult to separate. In addition, $TiH_2$ has very unique chemical properties. It is insoluble in water, resistant to moderate acid solutions, and has minimum or no solubility for other impurities in the $TiO_2$ rich material. Furthermore, $TiH_2$ is impervious to oxygen pickup compared to Ti metal, which helps to keep oxygen levels low in the final metal product. It should be noted that the insolubility of $TiH_2$ in water is attributed to its kinetic passivation by water. These properties set up a condition by which the product of the direct reduction of purified $TiO_2$ can be sequentially leached to remove other impurity elements to separate and purify the $TiH_2$. Although the chemical resistance of $TiH_2$ enables it to be separable from other impurities, if the particle size of $TiH_2$ is too small, e.g. in the sub-micrometer scale, it can also become soluble in those solutions.

In one aspect, molten salts can be used to facilitate the reduction process because the kinetic rates of the reactions can be improved by the use of the liquefied salt. Specifically, molten salts have very high conductivity and facilitate electron transfer during the reduction reaction. Molten salt also has the effect of helping dissolving by-products such as MgO or CaO during the reduction process. In addition to mono-metal chloride, binary salts such as $MgCl_2+NaCl$, $MgCl_2+KCl$, and $MgCl_2+CaCl_2$ can be used along with other binary and ternary salt mixtures.

Following reduction a titanium product including titanium hydride and often pure titanium, also includes MgO 630 as described above. MgO can be removed through an optional leaching step 632 similar to those described previously. For example, a weak acid such as, but not limited to, dilute HCl, organic acids, $HCl-HNO_3$ solution, acetic acid, ammonium chloride, and the like can be used to leach MgO to leave a hydrogenated titanium rich product. Dilute HCl aqueous solution is particularly effective for leaching of MgO to obtain clean purified $TiH_2$. Typically, this $TiH_2$ product can have a titanium content greater than about 95 wt %. Recovered MgO can optionally be regenerated to form Mg or $MgH_2$. In another embodiment, MgO can be leached using dilute HCl solutions sequentially by replenishing HCl as it is consumed.

Hydrochloric acid can be recovered from chlorine produced during the magnesium production process. The chlorine can be combined with hydrogen gas in a burner to produce HCl. The resulting hydrochloric acid can be reused in the leaching process as needed and the remainder sold.

The resulting purified titanium product 634 can be further treated by heat treatment step 636 to produce a titanium powder 638. Thus, a heat treatment step can be instigated to close the pores in $TiH_2$ powder to produce solid powder of more uniform size and outward morphology, while also substantially reducing specific surface area. As a general guideline, heat treated Ti powder 638 can have a specific surface area from about 0.01 $m^2/g$ to 0.5 $m^2/g$, and often from 0.08 $m^2/g$ to 0.15 $m^2/g$. The $TiH_2$ powder is also dehydrogenated during the heat treatment step. However, the heat treating cycle is so designed such that the hydrogen content in the heat treated powder may be controlled to vary between a few ppm to a few percent, and often between 0.01 to 1.0%. In some cases, a Ti powder 638 with a minor amount of hydrogen content (e.g. 0.5 to 1 wt %) is beneficial for separating particles that may have partially bonded during the heat treatment. In one specific example, the heat treatment can be carried out at 950° C. in argon with a dwell time controlled to be between 0 minutes to an hour. Regardless, heating $TiH_2$ to a temperature above about 400° C. in vacuum or at pressures lower than the equilibrium pressure of $H_2$ at the corresponding temperature can typically release the hydrogen. In another embodiment, the heat treatment step may be initiated in an argon atmosphere and then switched to hydrogen during cooling in order to facilitate particle separation.

Depending on the desired final product quality, the Ti powder 638 can be further purified by subjecting to a deoxygenation step 640 to form a highly purified Ti powder 642. In one example, the Ti powder can be deoxidized by Ca or $CaH_2$. An additional optional leaching step can be used to remove CaO and any other impurities using a weak acid such as those used in leaching step to form a purified titanium product.

Residual oxygen may be present in the product of reduction by Mg. Oxygen (O) has a high solubility in titanium. In α-Ti, the solubility is up to 33.3 at. % (14.3 wt. %). It has an adverse effect on the mechanical properties of Ti alloys. Even 0.35 wt. % oxygen can be significantly detrimental to the mechanical properties of Ti product, especially ductility. For commercially pure (CP) titanium (grade 1), an oxygen level less than 0.2 wt. % is required. Therefore, oxygen level in the powder can be minimized From a thermodynamic point of view, there is a limit for minimizing the oxygen in Ti using Mg at elevated temperatures, which is about ~1.5% at 600° C. In addition, the greatest driving force of titanium de-oxidation is the diffusion of oxygen atoms within titanium (when oxygen level is less than 33.3 at. %/14.3 wt. %). When de-oxidation of titanium is carried out above ~900° C., titanium transforms from a hexagonal close-packed (hcp) to body-centered cubic (bcc) crystal structure. In the latter structure, the diffusion of oxygen becomes relatively more active. Before reaching the transformation temperature of titanium, the diffusion speed of oxygen is low; however, after transformation to bcc structure at the high temperature above transformation, atomic movement occurs more than 100 times faster than before. Therefore a further high-temperature reduction step may be performed.

Calcium is one option for further minimizing oxygen from ~2% to less than 0.2% at high temperature. In one example, Ca metal can be mixed with the titanium powder 638 and heated to an elevated deoxygenation temperature. As a general guideline, temperatures from about 500° C. to about 1200° C. can be suitable. In one aspect, $CaH_2$ may be used as the reductant. $CaH_2$ is able to minimize the oxygen content in Ti less than 0.2%, which has been demonstrated in the so-called metal hydride reduction (MHR) process. Reportedly CP titanium has been produced in Russia from titanium dioxide by reduction with calcium hydride as follows:

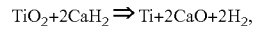

The reaction is performed at temperature range from 1100 to 1200° C.

CaO is an alternative to $CaH_2$, as CaO can reacts with Mg to form $CaH_2$ in hydrogen atmosphere.

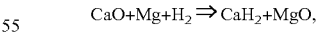

which occurs at ~530° C., confirmed by a DSC analysis.

In the $CaH_2$ reduction process, the titanium hydride (or titanium) powder, obtained from magnesium or magnesium hydride reduction process, can be mixed with $CaH_2$ or $CaH_2/CaCl_2$ and heated up to a temperature higher than that for a magnesium or magnesium hydride reduction process and held there for sufficient period of time to allow the removal of residual oxygen content in the titanium or titanium hydride powder. The unreacted $CaH_2$, $CaCl_2$ and produced CaO in the product of the $CaH_2$ reduction process can then be washed away to get titanium or titanium hydride powder with minimized residual oxygen.

The combination of the reductions by $MgH_2$ and $CaH_2$ is a two-step reduction process. This two-step reduction process is advantageous to a one-step reduction by either $MgH_2$ or $CaH_2$ in two ways: 1). The temperature of the first step reduction by $MgH_2$ is sufficiently low (e.g. from 400 to 900° C.) to minimize chance of alloying Ti with impurity elements; 2). By using $CaH_2$ to further deoxygenate the materials as the second step of reduction ensures minimization of oxygen content without having to use excessive amounts of calcium, compared to a one-step reduction using $CaH_2$.

In yet another alternative aspect, deoxygenation step 640 can be performed using a low temperature molten salt process. More specifically, a calcium halide eutectic salt can be mixed with solid calcium in the presence of the titanium product 638 at temperatures below the melting point of calcium. The calcium halide eutectic salt can be formed by mixing calcium halide with an alkali metal halide and heating to a eutectic melting temperature below the melting temperature of calcium (i.e. 842° C.). Most often the eutectic melting temperature can be at least 30° C. below the temperature of deoxygenation. The calcium halide can be $CaCl_2$, although KCl, LiCl, NaCl, and the like can be used. The alkali metal halide can include, but is not limited to, KCl, LiCl, and the like. When mixed in the molten eutectic salt, the solid calcium at least partially dissolves to act as a deoxygenation agent. When using calcium as the deoxidant, non-limiting options for the molten salt include:

a) Calcium halides salt, including $CaCl_2$, $CaBr_2$, $CaI_2$;
b) Calcium halide-alkali halide eutectic salt, including $CaCl_2$—LiCl, $CaCl_2$—KCl, $CaCl_2$—$MgF_2$, $CaCl_2$—LiF, $CaCl_2$—KF, $CaCl_2$—NaF, $CaCl_2$—NaBr, $CaCl_2$—LiBr, $CaCl_2$—KBr, $CaCl_2$—NaI, $CaCl_2$—LiI, $CaCl_2$—KI, $CaBr_2$_LiCl, $CaBr_2$—KCl, $CaBr_2$—$MgF_2$, $CaBr_2$—LiF, $CaBr_2$—KF, $CaBr_2$—NaF, $CaBr_2$—NaBr, $CaBr_2$—LiBr, $CaBr_2$—KBr, $CaBr_2$—NaI, $CaBr_2$—LiI, $CaBr_2$—KI, $CaI_2$—LiCl, $CaI_2$—KCl, $CaI_2$—$MgF_2$, $CaI_2$—LiF, $CaI_2$—KF, $CaI_2$—NaBr, $CaI_2$—LiBr, $CaI_2$—KBr, $CaI_2$—NaI, $CaI_2$—LiI, $CaI_2$—KI;
c) Calcium halide-calcium halide, eutectic salt, including $CaCl_2$—$CaBr_2$, $CaCl_2$—$CaI_2$, $CaCl_2$—$CaF_2$, $CaBr_2$—$CaI_2$, $CaBr_2$—$CaF_2$, $CaI_2$—$CaF_2$;
d) Eutectic salt formed from three or more salts mentioned in a), b) or c), which at least containing one calcium salt.

The resulting methods and process are capable of producing Ti powder from upgraded Ti slag (UGS) that meets ASTM standards for Ti sponge without having to use high temperature chlorination (e.g. $TiCl_4$), reduction of a titanium chloride, the conventional Kroll process, or electrolysis.

EXAMPLES

The feasibility of a method according to the present disclosure is exemplified by the following examples.

Example 1

Production of Ti powder from upgraded $TiO_2$-slag. Upgraded Ti-slag (UGS), assaying 94.5% $TiO_2$, was provided by Rio Tinto and used as the raw material in this work. The chemical composition of the UGS is given in Table 1, which shows that the impurity contents including Fe, Si, Mg and Al were all relatively high. UGS is commercially used as the feedstock for the chloride process of making $TiO_2$ pigment. It is typically processed in a fluidized bed and the particle size of UGS is usually in the range of several hundred microns. Thus, the UGS was wet milled and screened to minus 20 microns before alkaline roasting.

TABLE 1

| Chemical composition of original UGS (wt %) | | | | | | | | | |
|---|---|---|---|---|---|---|---|---|---|
| Ti | O | Fe | Mg | Al | Ca | Si | Cr | Mn | V |
| 56.7 | 40.4 | 1.0 | 0.42 | 0.26 | 0.09 | 0.84 | 0.05 | 0.03 | 0.22 |

Other chemicals used include NaOH, concentrated HCl solution, Mg metal, $MgH_2$ powder, Ca metal, anhydrous $MgCl_2$, $CaCl_2$, and KCl, and compressed hydrogen and argon. The reductants and anhydrous salts were purchased from Alfa Aesar and preserved in an inert-atmosphere glove box with circulated Argon to avoid oxidation and absorption of moisture. Water is purified with Milli-Q® (Millipore Corp.) equipment before use. Standard solutions for ICP-OES test are purchased from Inorganic Ventures.

Through the whole process, the chemical compositions and interstitial element contents of the solid and liquid intermediates and final product were monitored. Solid samples were totally dissolved by 6 mol/L HCl solution after being fused by the mixture of sodium carbonate and boric acid in a Pt crucible, then the solutions were analyzed using ICP-OES. The concentrations in the liquid samples were directly determined by using ICP-OES after being diluted. The contents of 0, N, H, C interstitial elements were determined by using LECO analyzers.

A Philips 1140 diffractometer (Cu Kα) X-Ray diffraction (XRD) unit was used to determine the phase compositions of the precursor, intermediates, and final products. The morphologies and the particle size and size distribution of the solid samples were observed and determined using a scanning electron microscope (SEM, FEI NovaNano 630). Particle size and size distributions were also determined using a Shimadzu particle size analyzer. The specific surface area was evaluated by using a BET analyzer (TriStar™ II). The density of the powder was measured using AccuPyc™ II 1340 Series Pycnometers.

As described earlier, UGS is selected as the raw material for production of Ti metal. UGS is composed primarily of titanium oxides and various impurities totaling approximately 5 wt %. Alkaline roasting is the first step to remove the impurities and purify $TiO_2$. The impurities in UGS can be classified into two categories, alkali-soluble impurities including Si, Al, V, Mn and Cr, and acid-soluble impurities including Fe, Al, V, Ca, Mg, Si, Mn and Cr. However, except for Si, most of the impurities in UGS do not exist as stand-alone phases; rather, they form solid solutions with $TiO_2$ in the form of rutile. Reported empirical formulas for the core and the rim of the rutile grains are $Ti_{0.896}Fe_{0.045}Mg_{0.089}Al_{0.024}V_{0.006}Cr_{0.002}Mn_{0.002}O_2$ and $Ti_{0.993}Fe_{0.003}V_{0.005}Cr_{0.001}O_2$, respectively. In other words, some impurities such as Fe, Mg, Al, and V, are hosted within the lattice of rutile. With regard to Si, it exists as a glassy silicate phase and fills the cracks between rutile grains. Si content was also minimized by desilication as previously described. Thus, the impurities were leached by destroying the structure and chemically separating them from the titanium dioxide.

Concentrated HCl may also be used to digest titanium minerals. However, to avoid using concentrated acid, the feedstock was pretreated with an alkaline roasting step, followed by dissolving the material in a low-concentration acid. NaOH was used as the reagent of alkaline roasting. Titanium dioxide and alkali-soluble impurities can be transformed during roasting into their sodium metallate salts, mainly $Na_2TiO_3$ accompanied by $Na_2SiO_3$, $NaAlO_2$, $Na_3VO_4$, $Na_2CrO_4$, $Na_3MnO_4$. Alkali-insoluble impurities can also be hosted by their sodium metallate salts or metal hydroxide compounds, such as $NaFeO_2$, $Na_2MgO_2$ and $Ca(OH)_2$. After roasting, the reaction product can be washed using water during which the excess NaOH will be dissolved, and most of the sodium combined with $Na_2TiO_3$ will be released to form water-soluble NaOH and alkali-insoluble metatitanic acid ($H_2TiO_3$). Additionally, the alkali-soluble impurity compounds will be dissolved into the NaOH solution, and the alkali-insoluble metals will be retained with metatitanic acid in their metal hydroxide compounds of $Fe(OH)_3$, $Mg(OH)_2$ and $Ca(OH)_2$. The reactions involved in this process are listed as Eq. (1) to Eq. (8). Thus, the goal of chemical separation between titanium and other impurities can be achieved.

Alkaline roasting:

$$Ti_{0.896}Fe_{0.045}Mg_{0.089}Al_{0.024}V_{0.006}Cr_{0.002}Mn_{0.002}O_2 + 2.067NaOH + 0.00525O_2 = 0.896Na_2TiO_3 + 0.024NaAlO_2 + 0.006Na_3VO_4 + 0.002Na_2CrO_4 + 0.002Na_3MnO_4 + 0.045NaFeO_2 + 0.089Na_2MgO_2 + 1.0335H_2O \quad \text{Eq. (1)}$$

$$Ti_{0.993}Fe_{0.003}V_{0.005}Cr_{0.001}O_2 + 2.006NaOH + 0.003O_2 = 0.993Na_2TiO_3 + 0.005Na_3VO_4 + 0.001Na_2CrO_4 + 0.003NaFeO_2 + 1.003H_2O \quad \text{Eq. (2)}$$

$$2NaOH + TiO_2 = Na_2TiO_3 + H_2O \quad \text{Eq. (3)}$$

$$2NaOH + SiO_2 = Na_2SiO_3 + H_2O \quad \text{Eq. (4)}$$

$$2NaOH + Al_2O_3 = 2NaAlO_2 + H_2O \quad \text{Eq. (5)}$$

Water washing:

$$Na_2TiO_3 + H_2O = H_2TiO_3 + 2NaOH \quad \text{Eq. (6)}$$

$$NaFeO_2 + 2H_2O = Fe(OH)_3 + NaOH \quad \text{Eq. (7)}$$

$$Na_2MgO_2 + 2H_2O = Mg(OH)_2 + 2NaOH \quad \text{Eq. (8)}$$

Experimental investigation of the NaOH roasting process was conducted at 500° C. for 1 hour with a mass ratio of NaOH to UGS of 1.5:1. The UGS was completely transformed during roasting without any leftover rutile. The chemical composition of the residue was analyzed using ICP and the results are shown in Table 2. Based on the composition it is deduced that the residue is primarily composed of $H_2TiO_3$. The effectiveness of the alkaline roasting process in terms of the removal rates of the impurities were calculated. The rates are as high as 97.5%, 94.5%, 88.8%, 83.0% and 78.8%, for Si, Al, V, Mn and Cr respectively. Even Fe and Mg were partially dissolved by the alkaline solution, which may be attributed to their limited but detectable solubility in the alkaline solution.

It should be noted that oxidation can be helpful during roasting because some of the impurities including V, Mn and Cr in the original UGS are in their reduced states of $V^{4+}$, $Mn^{2+}$ and $Cr^{3+}$, while only their sodium salts with high valence can be readily dissolved in the alkaline solution. This is attributed to the processes that produce UGS which include oxidation, reduction, and high pressure HCl leaching. Thus, the roasting was conducted in air.

TABLE 2

Chemical composition of the dried residue and the impurity removal rates

| | Element | | | | | | | | |
|---|---|---|---|---|---|---|---|---|---|
| | Ti | Fe | Mg | Al | Ca | Si | Cr | Mn | V |
| wt % | 40.00 | 0.483 | 0.156 | 0.010 | 0.072 | 0.038 | 0.008 | 0.004 | 0.017 |
| Removal rate (%) | 0 | 31.5 | 47.3 | 94.5 | 0 | 97.5 | 78.8 | 83.0 | 88.8 |

After the roasting process described above, the transition metal species such as Fe are still in the residue of water-washed alkaline roasted product, which was a mud-like intermediate. These impurities can be further separated from metatitanic acid. The pathway to achieve that is through total dissolution of the mud and re-precipitation of titanium dioxide from the Ti-bearing acid solution. As the result of the alkaline roasting, the chemically stable rutile in original UGS was been transformed into extremely active metatitanic acid, which was dissolved in diluted acid solutions (HCl or $H_2SO_4$) rapidly at a low temperature. The wet mud, containing 50% water mass content, was immersed in HCl solution to dissolve it. The initial HCl concentration of the solution was 6 mol/L and the experiment was conducted at 50° C. for 30-60 minutes. The total amount of HCl used is based on the total mass of Ti in the wet mud and reaction Eq. (9). It should be noted that the water in the wet mud was taken into account for determining the concentration of HCl solution.

After the dissolution, the leachate was filtered to remove insoluble particles and a transparent Ti-bearing solution was obtained in preparation for the hydrolysis step.

$$H_2TiO_3 + 4HCl = TiCl_4 + 3H_2O \quad \text{Eq. (9)}$$

The typical composition of the solution before hydrolysis is shown in Table 3.

TABLE 3

Main metal concentrations in the HCl leachate (mg/L)

| Ti | Mg | Al | Fe | Si | Ca | Cr | V | Mn |
|---|---|---|---|---|---|---|---|---|
| 49000 | 222 | 7 | 664 | 18 | 45 | 7 | 19 | 4 |

The reason for 6 mol/L HCl of the leaching medium is based on the following considerations: (1) Over-exorbitant lixiviant, such as concentrated HCl, will make the handling more difficult and the lack of water molecules has an adverse effect on dissolution; (2) Ti ions are not stable in weak acid solution and the generation of water during dissolution will further dilute the acid, which can create a risk of premature hydrolysis. The free HCl concentration in the leachate after the present dissolution was still as high as around 2 mol/L; (3) Even though it has been shown that 4 mol/L HCl also works, the lower the HCl concentration, the lower the Ti concentration and corresponding hydrolysis ratio. Thus, 6 mol/L HCl was used in this example.

Hydrolysis is a process of selective and spontaneous precipitation of Ti species from the Ti-bearing acid solution in the form of titanic acid. Various titanic acids with a general formula of $TiO_x(OH)_{4-2x}$ depending on water content can be obtained by controlling hydrolysis parameters. The general chemical reaction involved is shown as Eq. (10). The products of hydrolysis can be metatitanic acid $(TiO(OH)_2)$, orthotitanic acid $(Ti(OH)_4)$, or pyrotitanic acid $(H_2Ti_2O_5)$, and so forth.

$$Ti^{4+}+(4-x)H_2O=TiO_x(OH)_{4-2x}+4H^+ \qquad \text{Eq. (10)}$$

The liquid after dissolution of wet mud is a $TiCl_4$-bearing solution. In this solution, an equivalent concentration of $TiO_2$ based on the concentration of $Ti^{4+}$ was controlled to be around 80 g/L. The hydrolysis was carried out at 95-100° C. for 16 hours. The solution was continuously stirred.

Figure 8A:
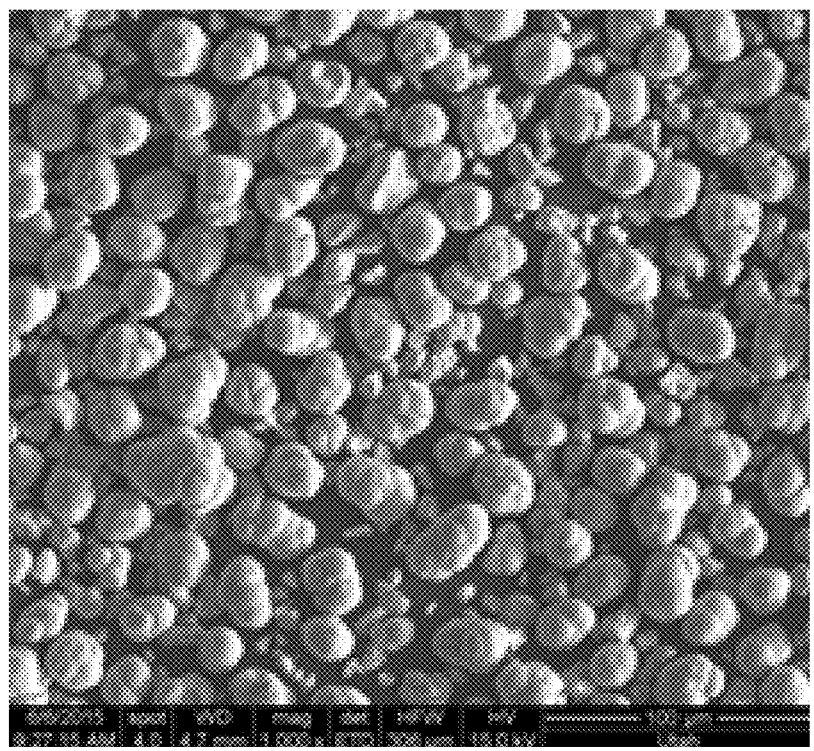
FIGS. 8A-B are SEM images of solid titanic acid particles produced in accordance with an example of the present disclosure.
Figure 8B:
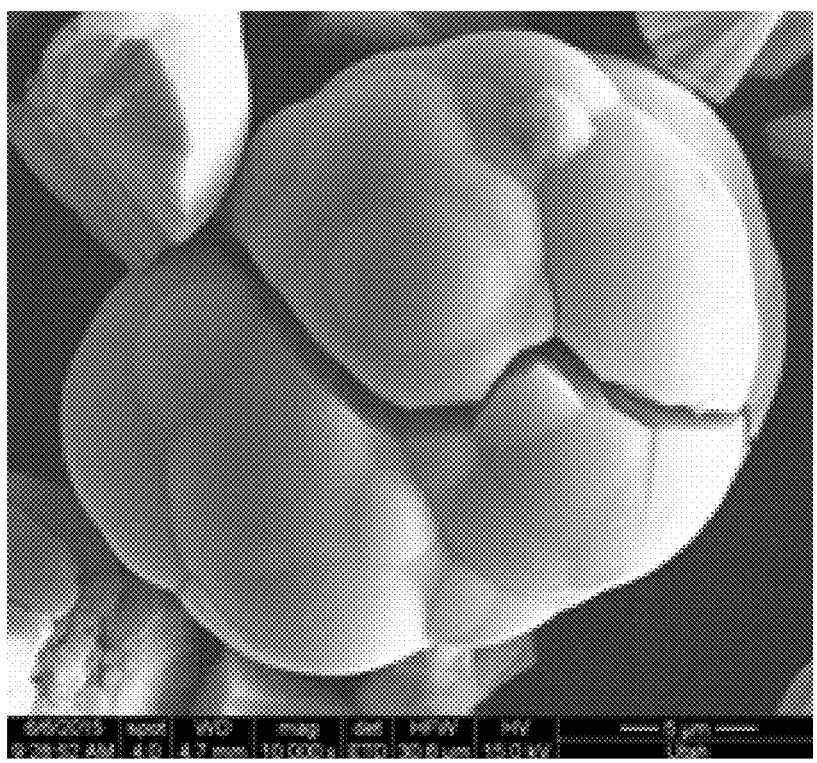
Figure 9:
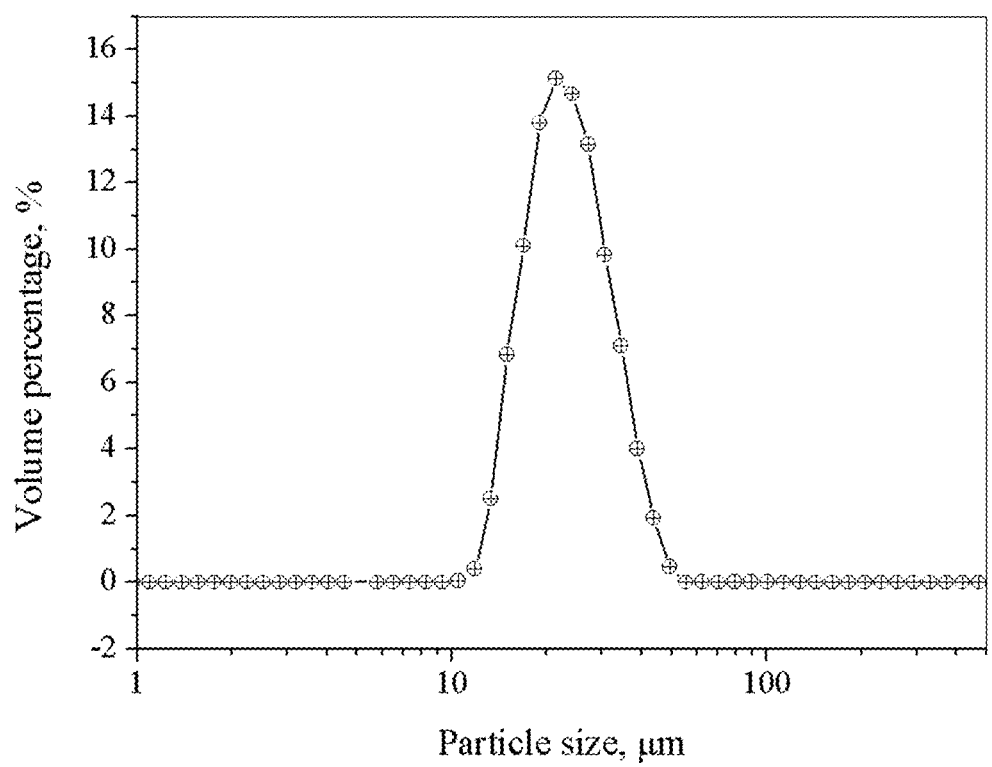
FIG. 9 is a graph showing a particle size distribution of solid titanic acid particles produced in accordance with an example of the present disclosure.

The product of hydrolysis was solid titanic acid particles, with particle sizes ranging from approximately 10 to 50 microns using the above parameters. The morphology and particle size distribution are shown in FIGS. 8A-8B and FIG. 9, respectively. Particles were mostly aggregates of fine crystals.

After the hydrolysis, the titanic acid precipitate was subjected to calcination by heating up gradually to dehydrate the precipitate particles and to obtain rutile at 900° C. in air. Rutile is the high-temperature stable phase that is easier to reduce than anatase. According to the weight loss during calcination, it was confirmed that the water content in the precipitate was approximately 10%, suggesting that the precipitate was pyrotitanic acid. The morphology of rutile particles inherits that of the titanic acid. And the purity of rutile, or impurity contents in the material were analyzed by using ICP and the results are shown in Table 4.

TABLE 4

Impurity contents in rutile prepared by hydrolysis and calcination

| Mg | Al | Fe | Si | Ca | Cr | V | Mn | C |
|---|---|---|---|---|---|---|---|---|
| 0.048 | 0.006 | 0.043 | 0.030 | 0.029 | 0.018 | 0.037 | 0.005 | 0.0035 |

There are two particular considerations during this process: purifying the material, especially the removal of iron, and controlling size and morphology of the particles. The purity of $TiO_2$ has a direct impact on the purity of Ti metal in the end. The ferric ion in the pre-hydrolysis solution was reduced by $Ti^{3+}$ ion to ferrous ion. During the precipitation of titanic acid, ferrous ion remained in the leaching solution, thus separating Fe from Ti, thereby minimizing iron content in $TiO_2$. Table 5 compares the Fe content as well as other compositions before and after the hydrolysis. The Fe content was significantly and sufficiently minimized in the $TiO_2$.

TABLE 5

Chemical composition comparison of the solution before and after hydrolysis (mg/L)

| | Ti | Mg | Al | Fe | Si | Ca | Cr | V | Mn |
|---|---|---|---|---|---|---|---|---|---|
| Pre-hydrolysis | 49000 | 222 | 7 | 664 | 18 | 45 | 7 | 19 | 4 |
| Post-hydrolysis | 880 | 231 | 8 | 690 | 4 | 52 | 5 | 4 | 5 |

In $TiO_2$ pigment production, iron is one of the detrimental impurities. If the iron content in titanic acid is high, it can invade the rutile crystal lattice as an isomorphous compound during high-temperature calcination, leading to the lattice deformation that affects the optical properties of pigment. Compared to the requirement for Fe content in $TiO_2$ pigment, the specifications of Ti sponge requires the Fe content to be less than 1500 ppm (calculated by elemental Fe), which is much easier to achieve than the grade required in pigment. Thus, additional steps would need to be taken to minimize Fe content in pigment sourced $TiO_2$.

With regard to particle sizes and morphology, the particle sizes of $TiO_2$ pigment are usually controlled to be around 0.2 and 0.3 microns in diameter, which is the size that is most efficient for scattering yellow-green light that human eyes are most sensitive to. In order to prepare the uniformly-distributed and nano-sized $TiO_2$, the hydrolysis is usually conducted by adding fine particles as seeds, with high initial equivalent $TiO_2$ concentration of around 190-230 g/L, and a F value (concentration ratio of effective acid to $TiO_2$) of 1.8-2.1. For production of pigment, hydrolysis is typically carried out at a high temperature of 114° C. (boiling hydrolysis) for a relatively short length of time (e.g. 2-4 hours). High temperature can increase nucleation rate and decrease particle size. The particle size and morphology of the precipitates are also affected by other variables such as time, free acid concentration, and the concentration of equivalent $TiO_2$.

In contrast to the production of $TiO_2$ pigment, relatively coarse $TiO_2$ was produced in order to produce relatively coarse Ti metal powder. As mentioned earlier, the oxygen content of Ti metal powder is a direct function of the particle size due to the formation of $TiO_2$ passive layer. For instance, for Ti spherical particles of 2 μm in diameter with a surface oxide layer of 3 nm in thickness, the oxygen content can be around 3900 ppm. Hence, in order to produce Ti metal with oxygen content less than 1500 ppm as required for Ti sponge, the particle size of Ti metal can be greater than 5.2 micrometers assuming the thickness of the passive oxide layer remains at 3 nm. Therefore, the hydrolysis can be controlled to decrease nucleation rate, control the growth rate, and allow for agglomeration of the particles.

The purified $TiO_2$ was reduced using Mg as a reducing agent. Mg is one of the reductants that can form oxides more stable than $TiO_2$. Compared to Ca, the cost of Mg is significantly lower than that of Ca, the potential reaction temperature will be lower, and controllability of the reduction process of using Mg will be better than using Ca.

Thermodynamically (based on the Ellingham diagram) the oxygen content in titanium is a function of the reaction temperature. The lower the reaction temperature, the lower the oxygen content in titanium. However, using lower temperature will inevitably encounter kinetic hurdles. Thus, it is a challenge to find a way to improve the kinetic rate of reduction at low temperatures while maximizing the potentials afforded by the thermodynamics of the system with respect to minimizing oxygen. To improve the efficiency and effectiveness of the reduction of $TiO_2$ using Mg, the Mg reduction was conducted in a hydrogen atmosphere using magnesium chloride salt as a medium. When the reaction is conducted in $H_2$, $TiH_2$ is formed. As pointed earlier, forming $TiH_2$ powder as the product of the reduction reaction can be more advantageous than forming Ti metal powder with respect to both oxygen content and purity of the product.

In this example, the same general approach for reduction is adopted. Purified $TiO_2$ was mixed with Mg metal and alkaline salt including $MgCl_2$. The mixture was heated and held at various temperatures in $H_2$ atmosphere. The reaction product included $TiH_2$ and MgO. MgO was leached using a dilute HCl solution to reduce oxygen content. The oxygen content in the product powder was measured using a LECO ONH analyzer. The following shows the effects of hydrogen, the effect of salt, and the effect of temperature on the reduction.

Additionally, magnesiothermic reduction generates a large amount of exothermic heat, which can lead to a system temperature as high as 1600° C. when the reduction is initiated. Consequently, the reaction was controlled at a relatively low temperature and with an acceptable reduction rate, avoiding any severe temperature spike.

Figure 10:
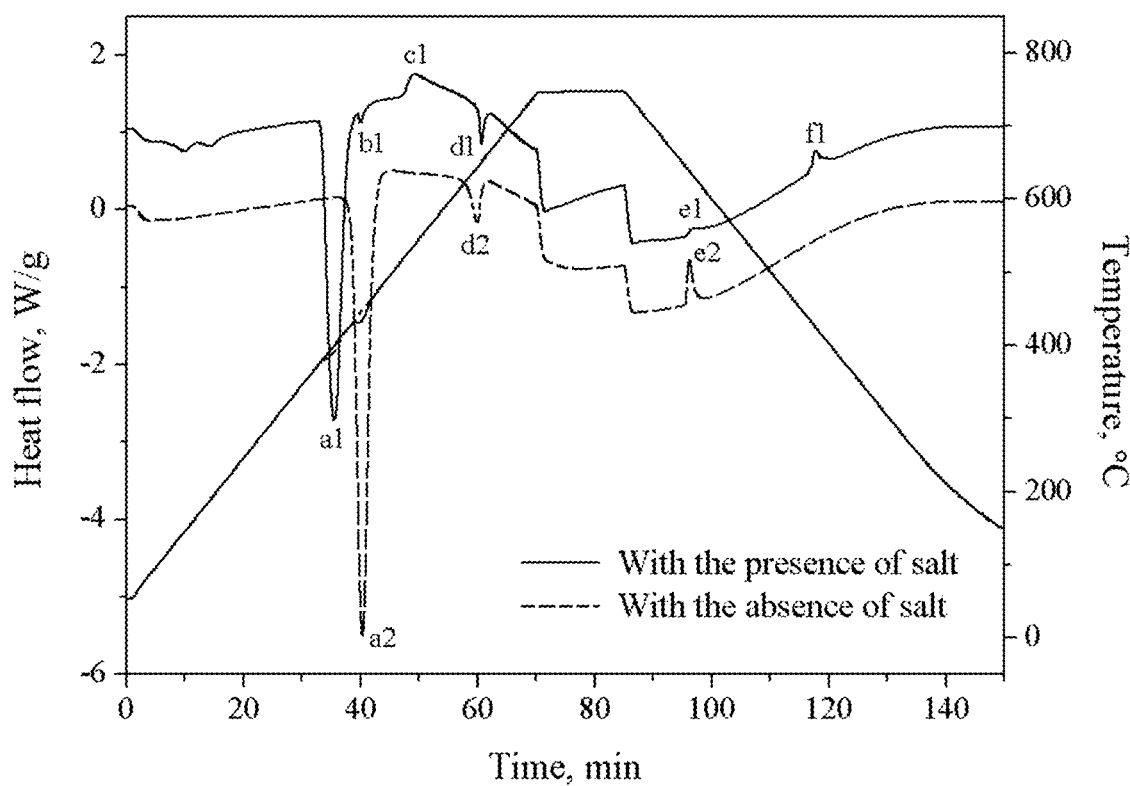
FIG. 10 is a graph showing differential scanning calorimetry (DSC) curves of TiO$_2$ mixed with MgH$_2$ with and without MgCl$_2$/KCl eutectic salt, in accordance with an example of the present disclosure.

A salt including $MgCl_2$ was also used in the reduction process. In order to understand the effect of salt, TGA-DSC analysis techniques were used. FIG. 10 presents the DSC curves during heating of a $TiO_2$ mixture with $MgH_2$ (compared to Mg metal, $MgH_2$ powder is easier to grind to finer sizes) with and without $MgCl_2$/KCl eutectic salt (molar ratio of $MgCl_2$ to KCl was 2:3), which shows a significant difference with respect to the exothermic heat due to the reduction reaction. In the presence of salt, an exothermic peak at 538° C. (c1) attributable to the reduction reaction was clearly visible. The reaction happened before the melting of Mg (d1 and d2). Furthermore, the peak that indicates the solidification of metallic Mg (e1 and e2) was notably smaller when the salt was added in the system, suggesting that there is little residual unreacted Mg. Accordingly, the reaction was more complete when the salt was used. Thus, it appears that the initial reaction temperature of Mg reduction was lowered and the kinetic rate was improved when the salt with a lower melting point than Mg was used.

Figure 11A:
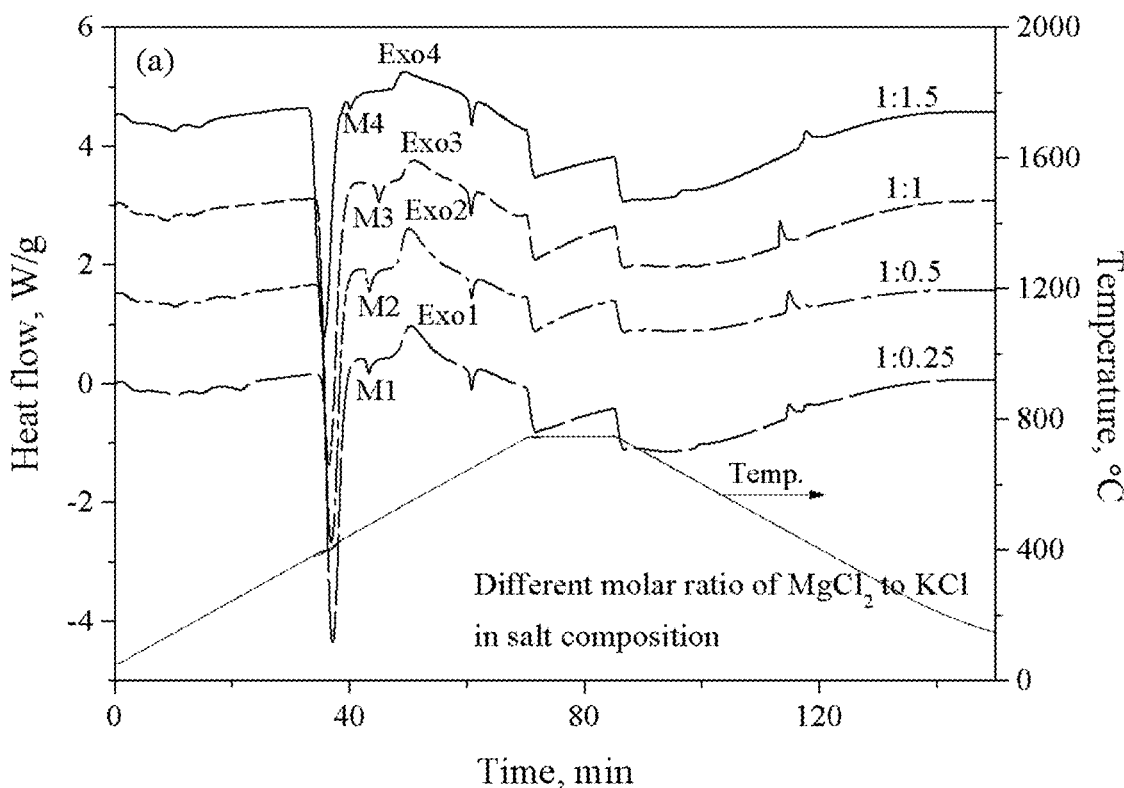
FIGS. 11A-B are graphs showing DSC curves of TiO$_2$ mixed with MgH$_2$ and MgCl$_2$/KCl salt at various ratios of MgCl$_2$:KCl, in accordance with an example of the present disclosure.
Figure 11B:
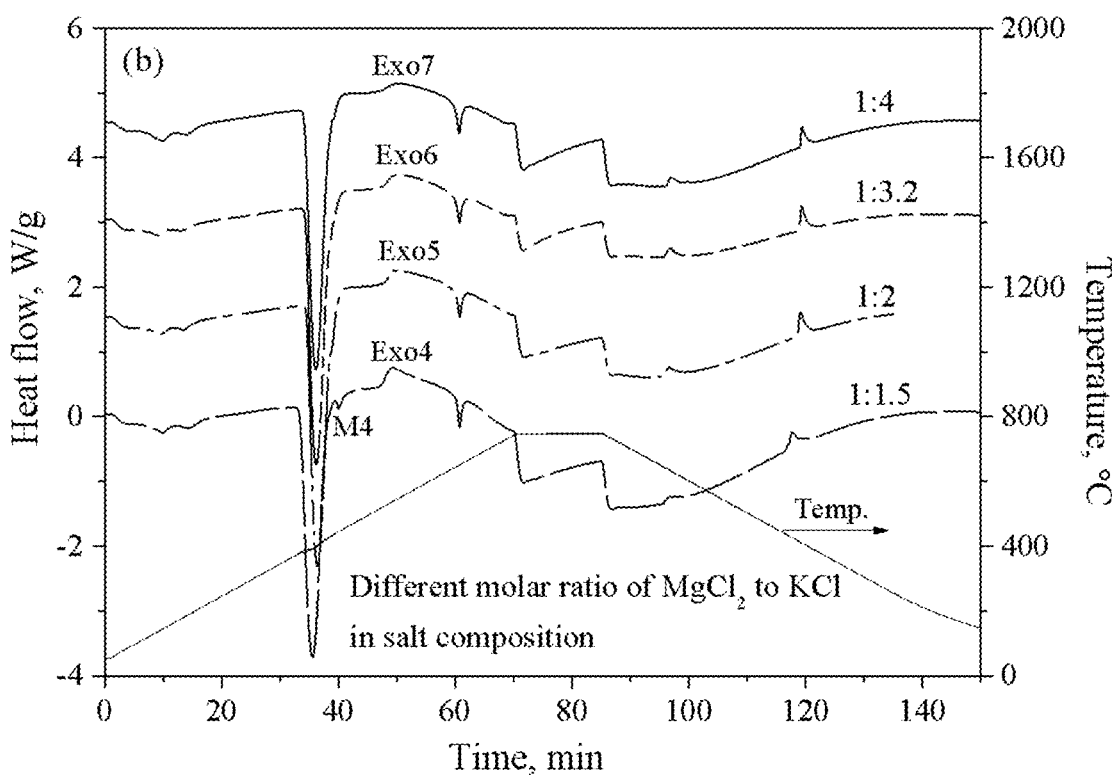

Furthermore, the TGA-DSC technique is also used to screen salt with different compositions. The DSC curves of salt mixtures with different ratios of $MgCl_2$:KCl were compared in FIGS. 11A and 11B. The mixed salts of $MgCl_2$ with KCl were considered because they generally possess lower eutectic temperatures. FIGS. 11A and 11B show that the peak temperature positions for the exothermic reactions were not affected significantly by the compositions of the salts. However, the intensity of the exothermic reaction varied. The peak intensity grew stronger when the molar ratio changed from 1:0.25 to 1:0.5, followed by a gradual weakening until the ratio reached 1:4. The stronger the exothermic peak, the smaller the remaining quantity of Mg, determined by the peak intensities for the solidification of remaining Mg. Hence, it seems that the most suitable molar ratio of $MgCl_2$ to KCl was 1:0.5 with respect to the kinetics of the reduction reaction.

Figure 12:
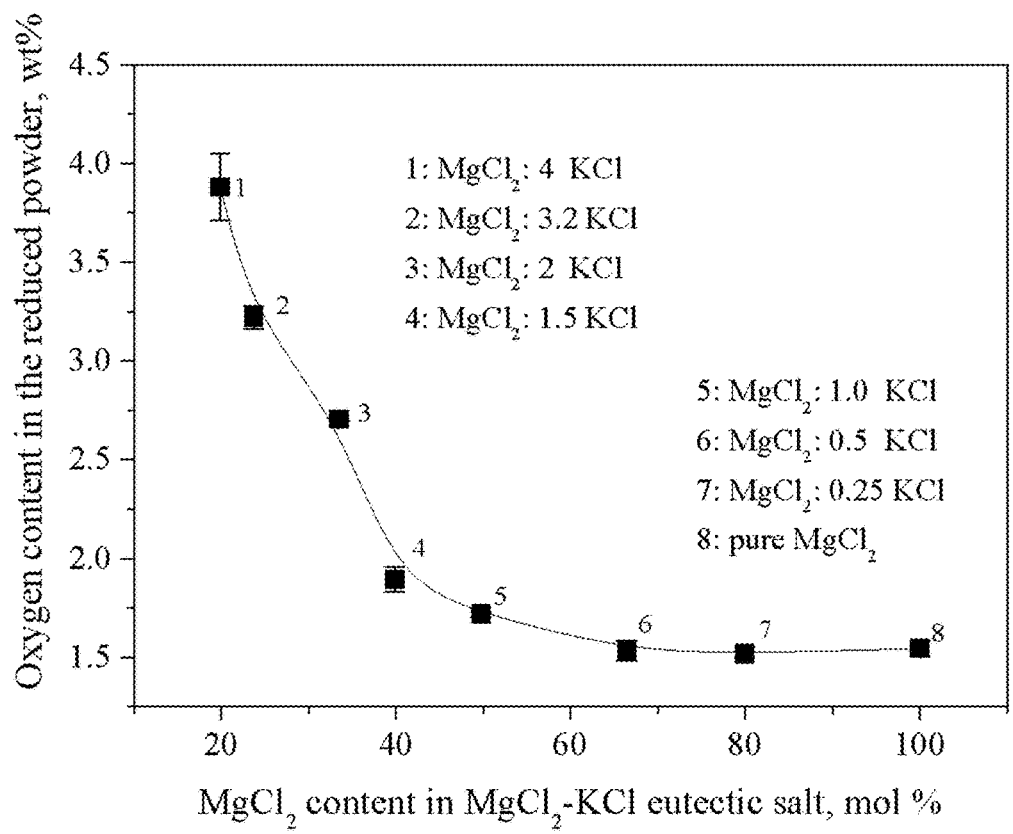
FIG. 12 is a graph showing oxygen content of reduced TiH$_2$ powder as a function of MgCl$_2$ content in the MgCl$_2$/KCl salt mixture, in accordance with an example of the present disclosure.

The effects of the compositions of salts were also compared by measuring the oxygen content after reduction. The reduction was conducted by holding the sample for 6 hours at 750° C. in $H_2$ atmosphere. The oxygen content in the reduced powder as measured using a LECO oxygen analyzer are shown in FIG. 12. The compositions of salts affect not only the kinetic rate, but also the oxygen content after reduction. The oxygen level in the reduced powder can be reduced to 1.5% when the $MgCl_2$:KCl molar ratio is greater than 1:0.5 at 750° C.

The DSC analysis showed that the reduction temperature with $MgCl_2$—KCl eutectic salt as medium should be set higher than 550° C. which is the temperature at which the exothermic peak appears. The effect of temperature was further investigated by experiments at various temperatures, namely 550° C., 590° C., 630° C., 680° C., 750° C. and 800° C. The temperatures were selected to cover the range of exothermic peaks and to be either higher or lower than the melting point of Mg.

Figure 13:
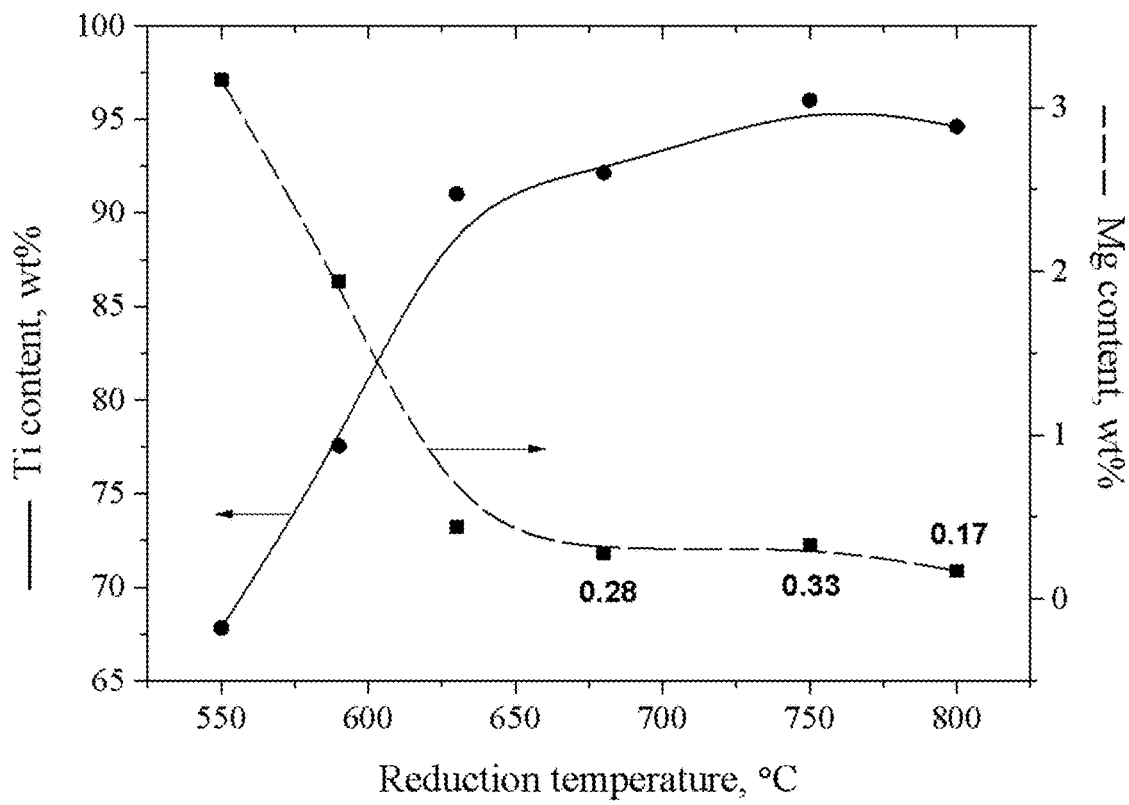
FIG. 13 is a graph showing Ti content and Mg content in TiH$_2$ powder after leaching MgO at various temperatures, in accordance with an example of the present disclosure.

The effect of temperature was evaluated by measuring the titanium contents in the powder after MgO is leached, as shown in FIG. 13 (The mass ratio of $TiO_2$ to salt was 1:0.5, and the excess coefficient of Mg was 1.5). It shows that the content of the main element Ti increased dramatically with the elevation of the reduction temperature, indicating that a temperature higher than the peak point in the DSC curve resulted in a relatively high degree of reduction. However, temperatures higher than the melting point of Mg are also beneficial for the reduction.

Additionally, the Mg contents were found to be high in samples that were reduced at lower temperatures. This may be attributed to the formation of magnesium titanate that is insoluble in the acid solutions.

Based on the previously discussed results, 750° C. was adopted as the optimum temperature for reducing $TiO_2$ with Mg.

As mentioned earlier, the Mg reduction was conducted in hydrogen atmosphere. The effect of hydrogen is shown in Table 6. It shows that the oxygen content of the product powder that was reduced in hydrogen atmosphere is significantly lower than that reduced in argon atmosphere. The primary advantage of using hydrogen atmosphere is to form $TiH_2$ powder as the product rather than Ti metal powder. $TiH_2$ is known to be impervious to oxygen therefore it is unlikely that it will re-oxidize after it is re-exposed to air. Forming $TiH_2$ during reduction also inhibits Ti from forming alloys with impurity elements during the reduction process. It is further believed that the thermodynamic equilibrium between Ti containing oxygen and Mg is different under hydrogen atmosphere than under inert atmosphere or vacuum, favoring the reduction of $TiO_2$.

TABLE 6

Oxygen content of the powder after Mg reduction in $H_2$ and Ar atmosphere

|  | $H_2$ atmosphere | Ar atmosphere |
|---|---|---|
| Oxygen content, wt % | 1.37% | 2.90% |

Based on the above, rutile particles with particle sizes in the range of 10-50 micrometer were prepared. The $TiO_2$ particles were mixed with the same mass of salt (mole ratio of $MgCl_2$ to KCl was 1:0.5) and 1.2-1.5 times of theoretical amount of Mg needed for reduction. The reduction was conducted at 750° C. in $H_2$ atmosphere for 6 hours.

Figure 14A:
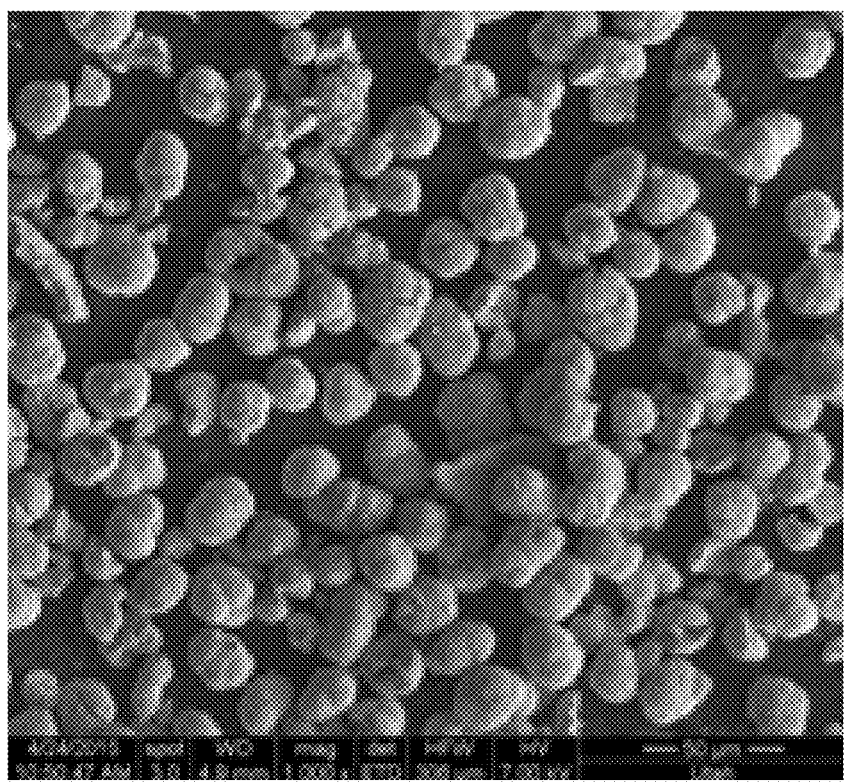
FIGS. 14A-B are SEM images of porous TiH$_2$ particles produced in accordance with an example of the present disclosure.
Figure 14B:
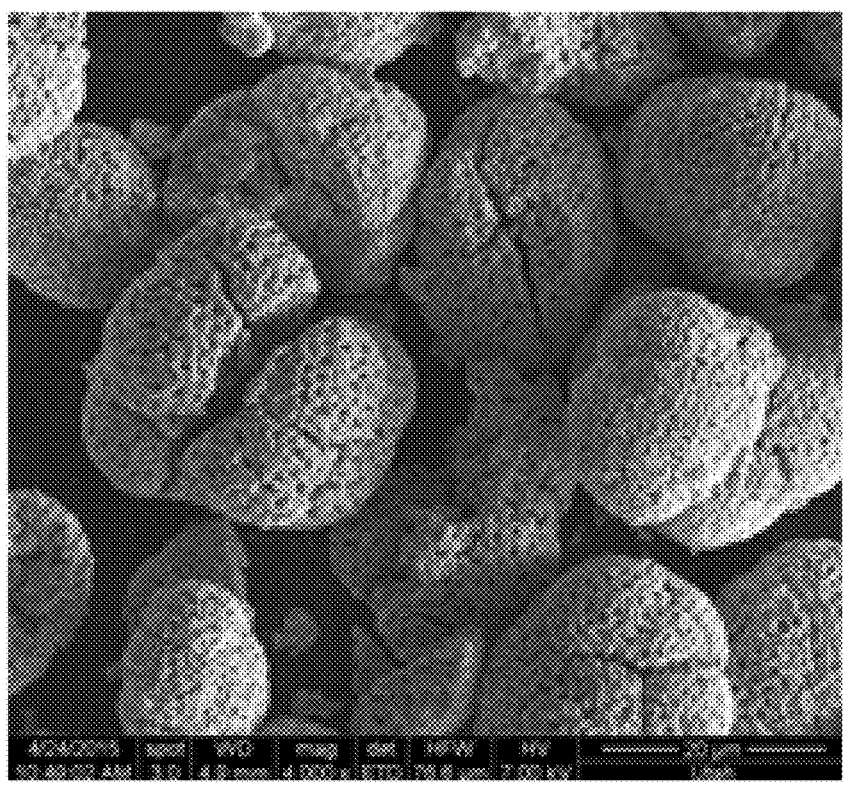

After reduction, the reduced powder was pulped by high-purity water first, and then leached by concentrated HCl using a peristaltic pump controlled dripping technique to remove MgO and the remaining Mg metal. The slurry was stirred for one-half hour until the pH value of the leachate reached 3 to 4. Finally, $TiH_2$ intermediate was obtained after filtration, water washing, and drying. The phase composition of the product powder was determined by using XRD. The metal and interstitial impurity contents in $TiH_2$ were analyzed using ICP as presented in Table 7. The morphology of $TiH_2$ was irregular and large in size with a porous structure having a BET determined specific surface area of 3.46 $m^2$/g. FIGS. 14A and 14B show the morphology of the porous $TiH_2$ produced by reducing the coarse $TiO_2$ using Mg.

TABLE 7

Impurity contents in $TiH_2$ intermediate

| Mg | Al | Fe | Si | Ca | Cr | V | Mn | O | C |
|---|---|---|---|---|---|---|---|---|---|
| 0.123 | 0.012 | 0.058 | 0.035 | 0.030 | 0.024 | 0.057 | 0.005 | 1.50 | 0.015 |

As indicated, the oxygen content of the $TiH_2$ powder after the reduction of $TiO_2$ by Mg was over 1%, which is too high for commercial Ti. Therefore, further measures are needed to reduce oxygen content. The oxygen content of Ti powder is typically a function of the particle sizes, which is inversely proportionally to specific surface areas of the powder. Therefore, one of the measures to reduce the final oxygen content is to reduce the specific surface area of the $TiH_2$ powder produced. The second measure is to subject the powder to a deoxygenation process, for example, using Ca.

Figure 15A:
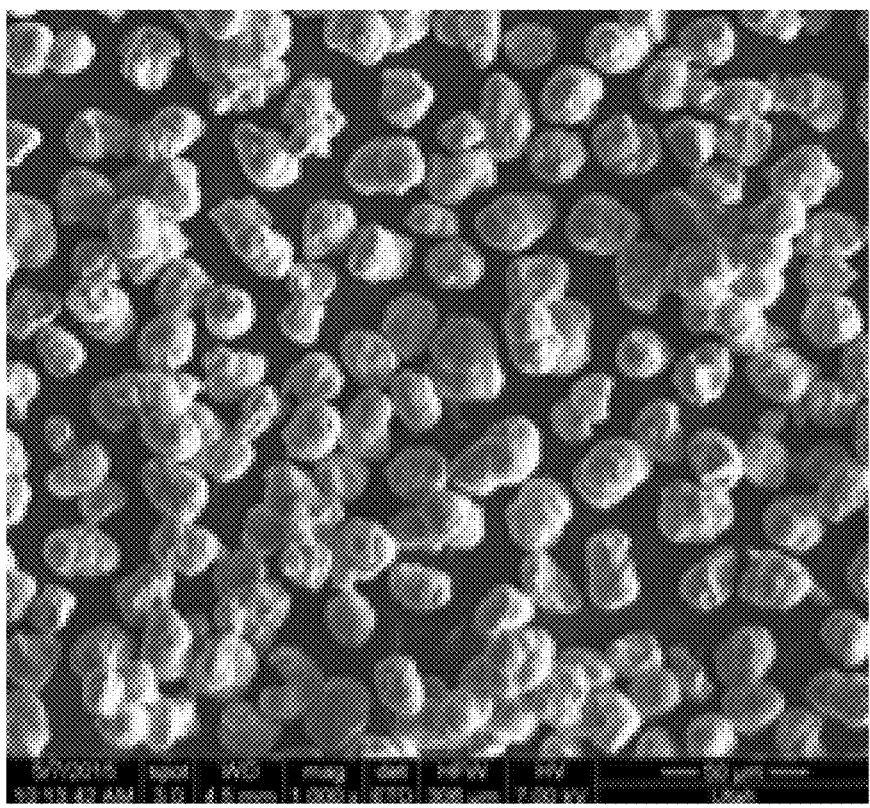
FIGS. 15A-B are SEM images of heat treated Ti particles in accordance with an example of the present disclosure.
Figure 15B:
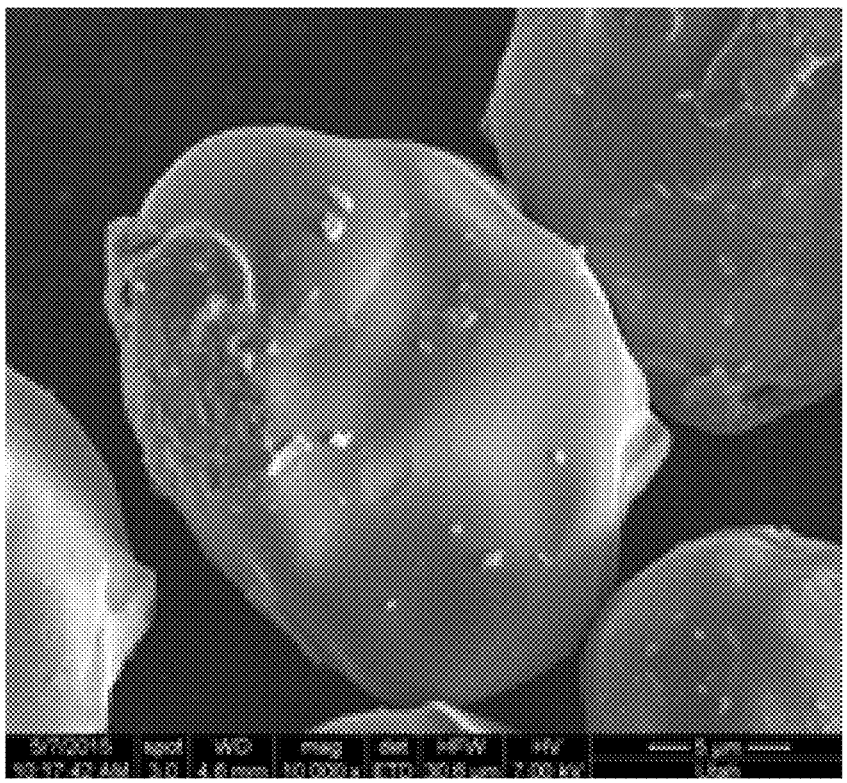
Figure 16:
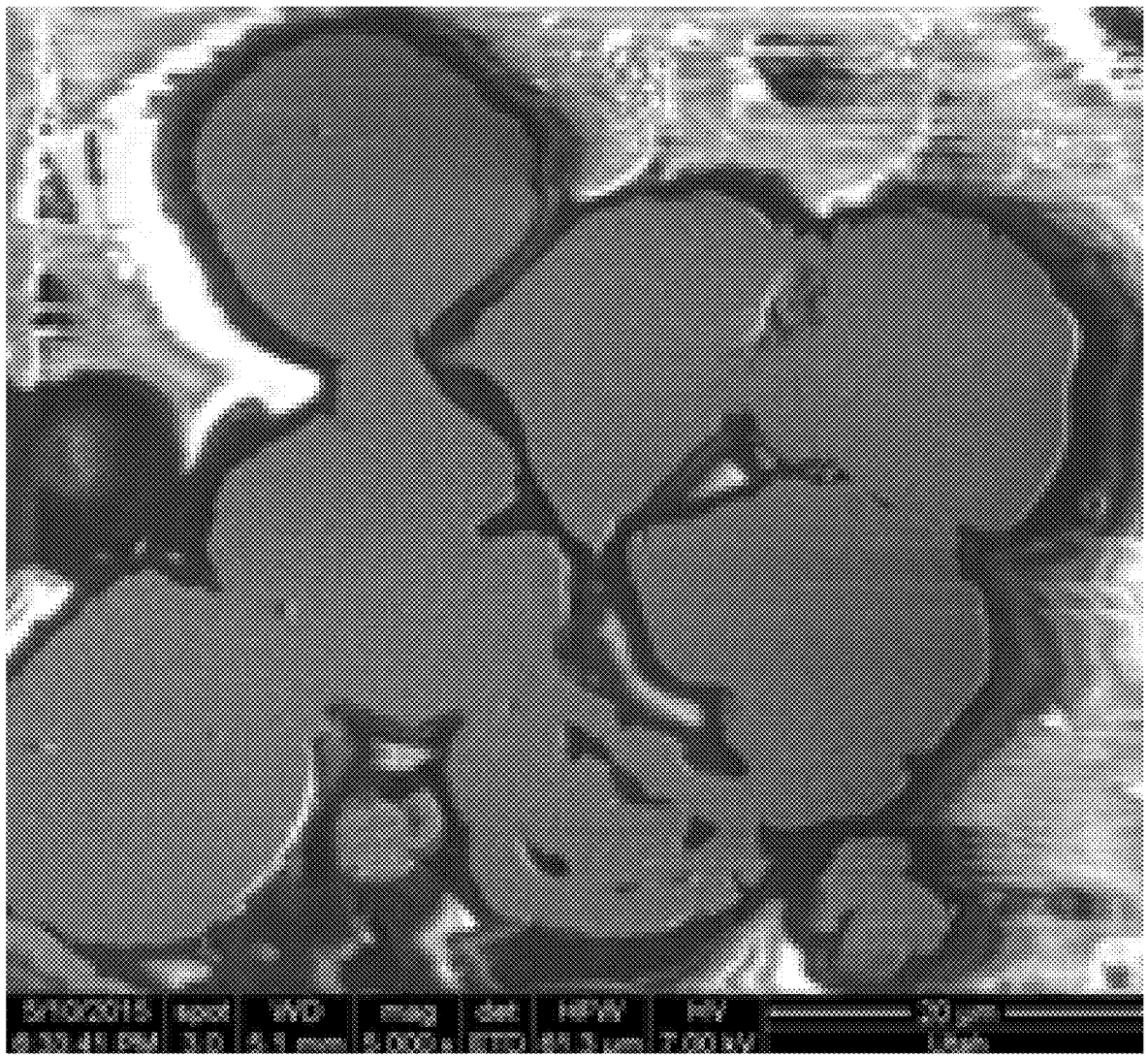
FIG. 16 is an SEM image of a cross section of heat treated Ti particles in accordance with an example of the present disclosure.

As shown earlier, the $TiH_2$ powder was porous. The sizes of the pores range from 400 to 600 nm. Consequently the specific surface area of the porous $TiH_2$ is extremely large. To reduce the surface area, the porous $TiH_2$ was heat treated in argon at 900° C. for 10 minutes. FIGS. 15A and 15B show the morphology of Ti particles obtained by heat treating porous $TiH_2$. $TiH_2$ particles were dehydrogenated at temperatures above 700° C. The volume of individual Ti particles shrank compared to original $TiH_2$ particles. The sizes are still as large as around 20 μm. The BET values of the powders were significantly decreased, from 3.46 $m^2/g$ to 0.09 $m^2/g$. The cross section of the Ti particles is shown in FIG. 16, illustrating that the porosity was eliminated after heat treatment. The high relative density of the powder was measured using a Pycnometer as 98.2% of the theoretical density. The oxygen content of the Ti particles after the heat treatment was measured to be 1.52%, which is almost the same as that of the $TiH_2$ before the heat treatment.

Figure 17A:
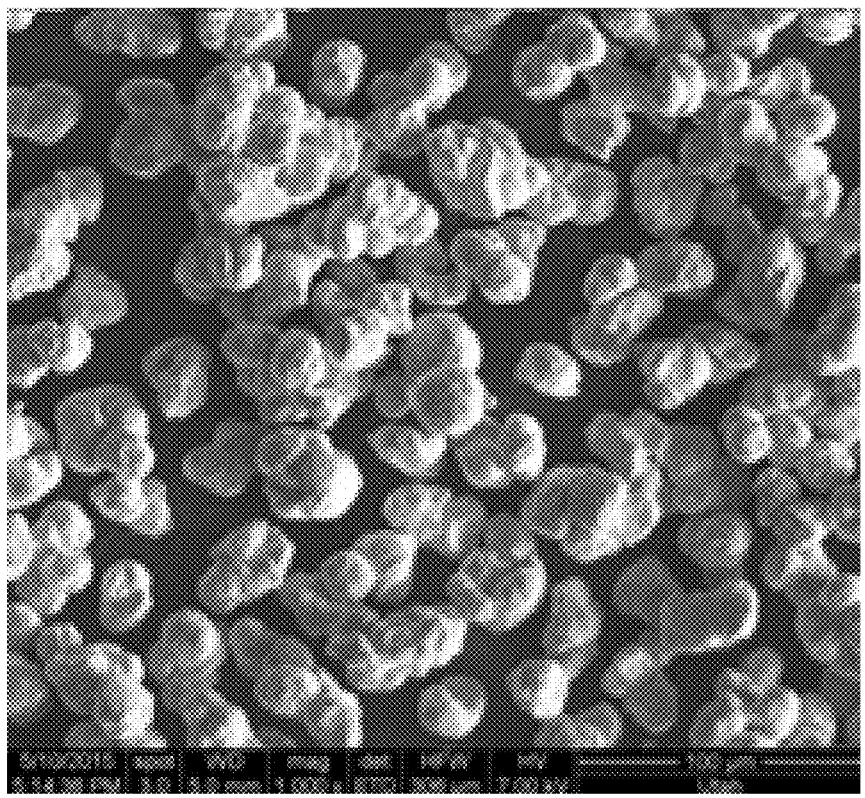
FIGS. 17A-B are SEM images of final Ti powder particles produced in accordance with an example of the present disclosure.
Figure 17B:
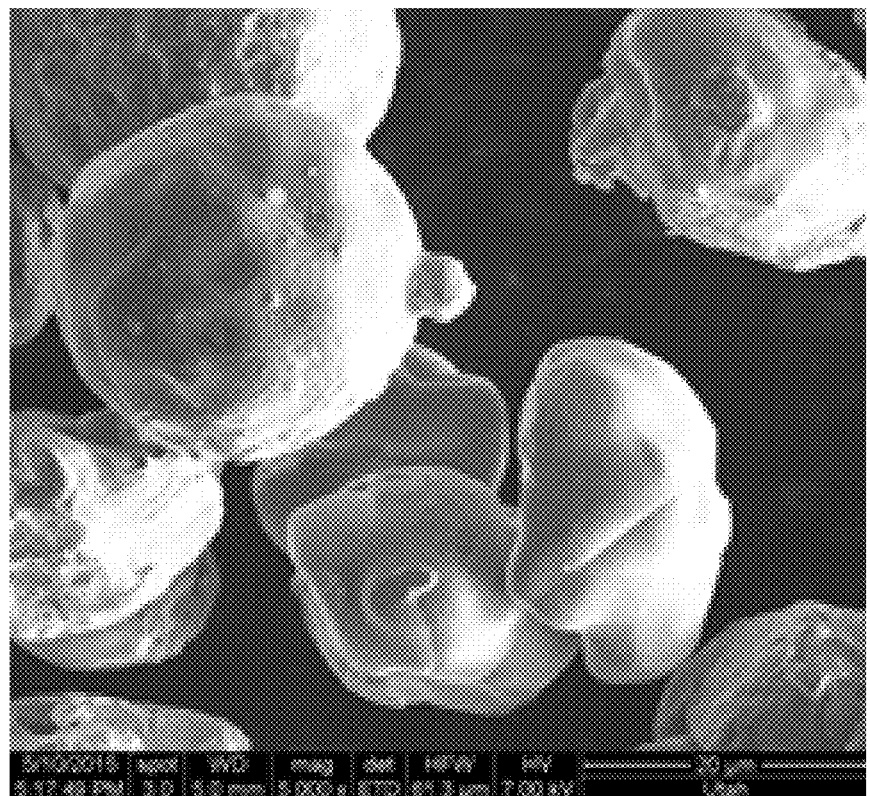

To further reduce the oxygen content of the Ti particles, a de-oxygenation step was applied to the powder after the heat treatment. De-oxygenation was carried out by mixing the powder with Ca metal and anhydrous $CaCl_2$—KClsalt, followed by treatment in argon between 600-1000° C. After de-oxygenation, the remnant Ca, CaO (byproduct), and salt were leached by using an HCl solution and washed using high-purity water. The morphology of final Ti metal powder is shown in FIGS. 17A and 17B, which inherited the shape of heat-treated Ti particles. The oxygen content of the powder was decreased drastically from 1.5% to 0.11% (Table 8). The chemical composition of the Ti powder produced by using this process is compared with the ASTM standard specifications for Ti sponge as shown in Table 8. The Ti powder produced using the process described herein meets the requirements of the ASTM standard.

TABLE 8

| Chemical composition of final Ti metal powder produced by this process | | | | | | | | | | |
|---|---|---|---|---|---|---|---|---|---|---|
| | Mg | Al | Fe | Si | Cl | Water | O | N | C | H |
| This work | 0.067 | 0.021 | 0.044 | 0.036 | / | / | 0.11 | 0.019 | 0.03 | 0.028 |
| ASTM-B299-13 (GP) | 0.5 | 0.05 | 0.15 | 0.04 | 0.2 | 0.02 | 0.15 | 0.02 | 0.03 | 0.03 |

Example 2

In order to get relatively pure $TiO_2$ for reduction, NaOH roasting of UGS and purification by hydrolysis of titanium chloride solution was designed. To remove the silica and alumina impurities before reduction, sodium hydroxide was used to roast UGS. The mass ratio of NaOH to UGS for roasting was 1.5:1, roasting temperature was 550° C., and roasting time was 1 hour. Sodium titanate was formed by this pretreatment, at the same time, water-soluble sodium silicate and sodium aluminate were formed as well. The roasting solid was washed with water to leach out excess NaOH, Si and Al impurities, also to liberate NaOH combined with titanate and form a washed product that is a derivative of the sodium titanate. By controlling the NaOH concentration in the leachate higher than 200 g/L, more than 80% silica and alumina existed in the UGS could be removed. The as-produced titanium hydroxide was digested by HCl solution to obtain titanium chloride solution, which then underwent the hydrolysis procedure to obtain pure metatitanic acid. The concentration of HCl solution was 18%, and the hydrolysis happened at a temperature near the boiling point of the solution and lasted for 6 hours.

The obtained pure metatitanic acid (a.k.a. titanium hydroxide) was mixed with $MgH_2$ and KCl—$MgCl_2$ eutectic salt. A 150% stoichiometric amount of $MgH_2$ was used. The mixed powder was heated at a heating rate of 10° C./min and held at 500° C. for 6 hours. The crucible was kept in the hydrogen atmosphere as it cooled. The crucible was removed from the furnace after purging Ar.

The reduced solid was leached by dilute acid solution, washed, dried and analyzed. XRD pattern confirmed that the major phase remained was also titanium hydride ($TiH_{1.924}$).

In yet another embodiment, another leaching route is to use dilute HCl solutions. HCl solution is so diluted that it does not dissolve the $TiH_2$ particles. However, HCl will react with MgO to remove into the solution. HCl can be added sequentially to leach MgO without dissolving $TiH_2$.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method for producing a titanium product, comprising:
    obtaining $TiO_2$ rich material as a purified $TiO_2$ having at least 70% by weight $TiO_2$;
    reducing the purified $TiO_2$ by combining with a metallic reducing agent and a molten salt at a temperature and a pressure to produce a hydrogenated titanium powder product comprising $TiH_2$ and optionally elemental titanium;
    heat treating the hydrogenated titanium powder product under a hydrogen atmosphere to coarsen the powder so as to reduce pore size and specific surface area to form a heat treated hydrogenated titanium powder product, wherein the hydrogen atmosphere is maintained during at least one of heating and cooling; and
    deoxygenating the heat treated hydrogenated titanium powder product to reduce residual oxygen to less than 0.2 wt % to form a deoxygenated hydrogenated titanium powder product.

2. The method of claim 1, further comprising reducing impurities in the $TiO_2$ rich material to produce the purified $TiO_2$.

3. The method of claim 2, wherein the $TiO_2$ rich material is a $TiO_2$-slag having a $TiO_2$ content from 70 wt % to 90 wt %.

4. The method of claim 3, wherein the UGS has a $TiO_2$ content greater than 90 wt %.

5. The method of claim 2, wherein the $TiO_2$ rich material is upgraded $TiO_2$-slag (UGS).

6. The method of claim 2, wherein the reducing impurities includes alkaline roasting the $TiO_2$ rich material to remove impurities from the $TiO_2$ rich material and produce intermediate products including alkaline leached $TiO_2$ rich material.

7. The method of claim 6, wherein alkaline roasting comprises:
combining NaOH with the $TiO_2$ rich material at a second temperature to transform $TiO_2$ into sodium titanate and to transform impurities into salts; and
washing the sodium titanate with water to remove the salts and produce derivatives of sodium titanate.

8. The method of claim 7, wherein the second temperature is between about 450° C. and about 650° C.

9. The method of claim 7, wherein the reducing impurities further comprises desilicating the alkaline roasted and water washed $TiO_2$ rich material to lower silica content prior to reducing.

10. The method of claim 9, wherein the desilicating is accomplished using a silica gel and a flocculant.

11. The method of claim 2, wherein the reducing impurities further comprises pre-leaching the $TiO_2$ rich material using an aqueous NaOH solution to remove silica.

12. The method of claim 2, wherein the reducing impurities further comprises:
hydrolyzing the $TiO_2$ rich material to form a titanic acid; and
calcining the titanic acid to form a coarse purified $TiO_2$ as the purified $TiO_2$.

13. The method of claim 12, wherein the coarse purified $TiO_2$ has a specific surface area from 10 $m^2$/g to 100 $m^2$/g, and an average particle diameter from 1 μm to 100 μm.

14. The method of claim 1, wherein the purified $TiO_2$ has greater than about 99 wt % $TiO_2$.

15. The method of claim 1, wherein the purified $TiO_2$ has greater than about 99.5 wt % $TiO_2$.

16. The method of claim 1, wherein the purified $TiO_2$ is purchased commercially.

17. The method of claim 1, wherein the metallic reducing agent comprises at least one of Mg, $MgH_2$, and $CaH_2$.

18. The method of claim 1, wherein the molten salt comprises at least one of a mono chloride, binary chloride salt and a ternary chloride salt.

19. The method of claim 1, wherein the reducing occurs in a hydrogen atmosphere and the metallic reducing agent is Mg and $MgH_2$.

20. The method of claim 1, wherein the specific surface area of the heat treated hydrogenated titanium product is from about 0.01 $m^2$/g to 0.5 $m^2$/g.

21. The method of claim 1, wherein the deoxygenating is accomplished by heating a molten calcium salt in the presence of solid calcium and the titanium product to a temperature below the melting point of calcium.

22. The method of claim 21, wherein the molten calcium salt includes $CaCl_2$ and at least one of KCl and LiCl.

23. The method of claim 1, wherein the method is free of chlorination and electrolysis.

24. The method of claim 1, wherein the molten salt includes $MgCl_2$.

25. The method of claim 1, further comprising removing MgO from the hydrogenated titanium product prior to deoxygenating.

26. The method of claim 1, wherein the deoxygenating is accomplished using $CaH_2$.

27. The method of claim 1, wherein the deoxygenating occurs under one or both of Argon and hydrogen atmosphere.

28. The method of claim 1, further comprising leaching impurities including MgO from the deoxygenated hydrogenated titanium product.

29. The method of claim 1, wherein the heat treating includes:
heating the hydrogenated titanium product where the hydrogen atmosphere is controlled to maintain a hydrogen content of the hydrogenated titanium product; or
heating the hydrogenated titanium product under an argon atmosphere and then switching to the hydrogen atmosphere during a cooling phase.

* * * * *